United States Patent [19]
Imaiida

[11] Patent Number: 5,659,369
[45] Date of Patent: Aug. 19, 1997

[54] VIDEO TRANSMISSION APPARATUS FOR VIDEO TELECONFERENCE TERMINAL

[75] Inventor: Satoshi Imaiida, Tokyo, Japan

[73] Assignee: Mitsubishi Denki Kabushiki Kaisha, Tokyo, Japan

[21] Appl. No.: 364,313

[22] Filed: Dec. 27, 1994

[30] Foreign Application Priority Data

Dec. 28, 1993 [JP] Japan .................................. 6-337750

[51] Int. Cl.$^6$ ...................................................... H04N 5/46
[52] U.S. Cl. ........................... 348/556; 348/558; 348/473; 348/358
[58] Field of Search ............................. 348/15, 17, 556, 348/558, 473, 333, 358; H04N 7/14, 5/46

[56] References Cited

U.S. PATENT DOCUMENTS

| | | | |
|---|---|---|---|
| 5,111,292 | 5/1992 | Kuriacose | 348/473 |
| 5,280,540 | 1/1994 | Addeo et al. | 348/15 |
| 5,365,276 | 11/1994 | Imai et al. | 348/556 |
| 5,420,632 | 5/1995 | Yamagiwa | 348/240 |
| 5,444,492 | 8/1995 | Kihara | 348/556 |
| 5,475,442 | 12/1995 | Matsushita | 348/445 |

FOREIGN PATENT DOCUMENTS

| | | |
|---|---|---|
| 4-27288 | 1/1992 | Japan . |
| 4-249492 | 9/1992 | Japan . |
| 2079090 | 4/1980 | United Kingdom . |

OTHER PUBLICATIONS

Mitsubishi Denki Giho, vol. 64, No. 8, 1990, Socio-Tech, pp. 45(657)–88(700).

*Primary Examiner*—Sherrie Hsia
*Attorney, Agent, or Firm*—Wolf, Greenfield & Sacks, P.C.

[57] ABSTRACT

A video transmission apparatus for a video teleconference terminal for displaying video signals with a proper aspect ratio in a video teleconference terminal which transmits and receives video signals representing pictures of different aspect ratios. The video transmitter determines, from among the video signals generated by the cameras having different aspect ratios, which signal should be transmitted to the receiving terminal by a key operation on the operation pad. The result of selection by the operation pad is sent via a video controller to a transmission video signal selector, which selects one of the outputs from the cameras according to the result. The video signal from the selected camera is output to a video signal transmitter as a transmission video signal. A CPU of the video controller recognizes the selecting operation on the operation pad and, accordingly, generates a display control signal which indicates an aspect ratio corresponding to the camera thus selected. The display control signal generated is output to the video signal transmitter via a transmission display control interface. The video signal transmitter multiplexes the display control signal and the transmission video signal and sends the resultant signal over a communication network.

19 Claims, 14 Drawing Sheets

VIDEO TRANSMISSION APPARATUS FOR VIDEO TELECONFERENCE TERMINAL

BACKGROUND OF THE INVENTION

1. Field of the invention

The present invention relates to a video transmission apparatus used in a video teleconference system or the like.

2. Description of the Related Art

FIG. 10 is a system configuration diagram of a video teleconference terminal of the prior art proposed in an article "Video teleconference system" (Mitsubishi Electric Corporation Technical Report, vol.64, No.8, August 1990). In the drawing, the monitor 300 is a motion picture monitor for human figures which displays received motion pictures of teleconference participants at a remote location, or the transmitted motion pictures of participants at the present location, by switching between the two. The motion picture monitor 300 has an aspect ratio (width to height ratio) of 4:3. A microphone 301 is used for the input of the conversational voices of the teleconference participants. Voices signals inputted to the microphone 301 are transmitted under the control of a voice controller 302. A camera 303 is a human image capturing camera having an aspect ratio of 4:3 used in capturing the images of the conference participants. A loudspeaker 304 is used to provide the amplified voices of the conference participants at the remote location, these voices' having been transmitted. A monitor 307 is a still picture monitor used to display still pictures transmitted from the remote location or still pictures captured at the present location.

An operator of the video teleconference terminal uses an operation pad 308 to zoom in or out, to focus and orient the human image capturing camera 303, to select the pictures to be displayed on the monitor 300, to transmit the still pictures and control the volume of the loudspeaker 304 output.

A document image capturing camera 309 captures still pictures of documents or small solid objects and converts the pictures into electrical signals. A video controller 310 carries out control operations such as switching of input pictures from the cameras 303 and the document image capturing camera 309 and switching of video signals from a video teleconference terminal at the remote location, according to the operator's control with the operation pad 308.

The video teleconference terminal is capable of entering handwritten characters and drawings by means of an electronic writing pad 311 and a wireless pen 312. The video teleconference terminal is also capable of entering characters and drawings by means of an electronic white board 313. A white board monitor 314 displays the characters and drawings entered via the electronic writing pad 311 or the electronic white board 313. A video printer 315 produces hard copies of the characters and drawings displayed on the white board monitor 314. An auxiliary controller 316 controls the communication with the writing pad and the electronic white board of the video teleconference terminal at the remote location.

A video transmitter 317 has a video CODEC and an audio codec, and transmits signals from a voice controller 302, a video controller 310 and the auxiliary controller 31 to the remote location. A digital network 318 is an ISDN network (integrated services digital network) such as INS64 (information network system 64) or INS1500 which connects the video teleconference terminal of the present location and the video teleconference terminal at the remote location.

The video teleconference terminal is further provided with a digital facsimile 319 which transmits and receives text messages, an ordinary telephone 320 and a data terminal 321 for data file transmission. A time-division multiplexer (TDM) 322 transmits data of the digital facsimile 319, the telephone 320 and the data terminal 321 after time-division multiplexing of the data. A high-speed digital leased line 323 permanently connects the video teleconference terminals at the present and remote locations.

In an actual session of video teleconference, the video teleconference terminals shown in FIG. 10 as described above are installed at the present location and the remote location (location of the other party in the conference). Communication between these video teleconference terminals constitutes the video teleconferencing.

Now the operation of the video teleconference terminal of the prior art shown in FIG. 10 will be described below.

First the operations at the transmitting terminal will be described.

Voices of participants are received by a microphone 301. The received voice signals are input to the voice controller 302 where feedback from the loudspeaker 304 is removed by an echo canceler, before being sent to the video transmitter 317. Pictures of the participants captured by the human image capturing camera 303 are transmitted to the video transmitter 317 as motion pictures to be transmitted, via the video controller 310. Still pictures of documents and small solid objects captured by the document image capturing camera 309 are also transmitted to the video transmitter 317 via the video controller 310.

Characters and graphics entered in handwriting by the participants of the conference on the writing pad 311 or the electronic white board 313 are transmitted via the auxiliary controller 316 to the video transmitter 317. The video transmitter 317 transmits the audio, video, text and graphic data received from the voice controller 302, the video controller 310, and the auxiliary controller 316 to the video teleconference terminal at the remote location via an ISDN link 318, or by using a high-speed digital leased line 323 via the TDM 322.

Now the operations at the receiving end will be described below.

The audio, video, text and graphics data received by the video transmitter 317 at the receiving end, from the video teleconference terminal at the remote location is appropriately divided among the audio controller 302, the video controller 310 and the auxiliary controller 316. The audio signals are processed in the audio controller 302 and output from the loudspeaker 304, while motion picture signals are processed by the video controller 310 and displayed on the human picture monitor 300. Still picture signals are processed by the video controller 310 and displayed on the still picture monitor 307, while the text data and graphics data are processed by the auxiliary controller 316 and displayed on the white board monitor 314 or printed out on the video printer 315. Signals from the digital facsimile 319, the telephone 320 and the data terminal 321 of the video teleconference terminal at the other location are transmitted via the TDM 322 to a terminal of the same kind, where they are output.

Now, a portion of this apparatus related to the video signal transmission will be described in detail below with reference to FIG. 11. In FIG. 11, components identical with those shown in FIG. 10 will be identified with the same numerals.

In FIG. 11, a monitor 300 is a motion picture monitor having an aspect ratio of 4:3. A camera 303a is a panoramic camera generating a video signal 333 having an aspect ratio of 4:3. A motor-driven camera 303b is capable of varying the camera orientation and the magnification factor of the zooming operation by means of a motor, via remote control. It is also capable of focusing at a near field or far field by means of a motor, also via remote control. The motor-driven camera 303b generates a video signal 334 having an aspect ratio of 4:3.

The video signal transmitter 317 carries out digital compression and encoding of the video signal 332 to be transmitted and multiplexes it with other signals, before sending it over the ISDN network 318. The video signal transmitter 317 demultiplexes a signal received from the ISDN network 318 and carries out digital decoding and expansion of the compressed coded digital video signal, thereby generating the received video signal 331. A transmission video signal selector 324 is a switch to select which, of the video signal 333 from the camera 303a or the video signal 334 from the motor-driven camera 303b, should be output, and is controlled by means of a transmission video signal selection interface(I/F) 354 of the video controller 310. The video signal selected by the selector 324 is output to the video signal transmitter 317 and to a monitoring video signal selector 325. The monitoring video signal selector 325 is a device to select video signals to be displayed on the monitor 300 of the video teleconference terminal at the present location, and selects one from the received video signal 331, which is output from the video signal transmitter 317, and the transmission video signal 332 of the video teleconference terminal at the present location, which is output from the transmission video signal selector 324, and then outputs it as the monitoring video signal. The monitoring video signal selector 325 is controlled by means of a monitoring video selection interface 355 of the video controller 310.

The video controller 310 controls the motor-driven camera 303b, the transmission video signal selector 324 and the monitoring video signal selector 325. The video controller 310 comprises a CPU 350, a memory 351, a bus 352, a camera control interface 353, a transmission video signal selection interface 354, the monitoring video signal selection interface 355 and an operation pad interface 356. An operator or user can control the video controller 310 to switch the video signals by operating keys of the operation pad 308.

The CPU 350 carries out operations required to control the interfaces. The memory 351 comprises a program storing ROM, a working data storing RAM, and other components. The CPU 350, the memory 351 and input/output interfaces are connected by the bus 352. The camera control interface 353 is used in the control of the motor-driven camera 303b. The transmission video signal selection interface 354 controls the transmission video signal selector 324. The monitoring video signal selection interface 355 controls the monitoring video selector 325. The operation pad input interface 358 is an interface for reading, the key operation status of the operation pad 308.

FIG. 12 schematically shows the overview of the operation pad 308. In FIG. 12, a button 381 is used to select the panoramic camera 303a, and a button 382 is used to select the motor-driven camera 303b. A button 383 is used to display the transmission video signal 332 on the monitor 300, and a button 384 is used to display the received video signal 331 on the monitor 300. Buttons 365 through 368 and buttons 369 through 372 are used to control the motor-driven camera 303b. The button 365 is used to zoom in and the button 366 is used to zoom out. The buttons 367 and 368 are used for focusing. Namely the button 367 is used to focus at far points and the button 368 is used to focus at near points. The buttons 369 through 372 are used to orient the motor-driven camera 303b, specifically the button 369 is to direct the camera 303b upward, the button 370 is to direct the camera downward, the button 371 is to direct the camera to the left and the button 372 is to direct the camera to the right. The video controller 310 switches the video signals according to such key operations of the operation pad 308 as have been described above.

The buttons 373 through 376 are used to preset the operations. A series of button operations can be registered corresponding to one of these preset buttons, so that pressing the preset button has the effect of causing the video controller to carry out the same series of operations as have been registered. To zoom in on a certain participant during a session of video teleconference, for example, a series of operations including directing the camera, zooming up and focusing are required. In the case where a particular participant should frequently be zoomed in on, the series of operations required can be registered as a preset button operation, which makes it possible to zoom in on the particular participant simply by pressing the preset button. Pressing one button is sufficient to set the camera angle. The operation pad shown in FIG. 12 is provided with four buttons by way of example. The button 377 is a registration button, used to register the operation information of the camera in correspondence to the preset buttons 373 through 376. This registration is carried out by storing the operation information of each preset button in the video controller 310.

Now the operations for video signal transmission with the conventional video teleconference terminal will be described below with reference to FIG. 11 and FIG. 12. When the power is turned on, the video controller 310 shown in FIG. 11 is initialized. That is, the video controller 310 controls the motor-driven camera 303b to be directed to the initial camera angle which has been preset. The video controller 310 also controls the transmission video signal selector 324 by means of the transmission video signal selection interface 354 to thereby select the video signal 334 output from the motor-driven camera 303b, and controls the monitoring video selector 325 by means of the monitoring video selection interface 355 to thereby select the transmission video signal 332. Thereafter the video controller 310 monitors the key operations on the operation pad 308 by means of the operation pad input interface 356 and, when a key is pressed, carries out the control operation corresponding to the key.

When a panoramic camera button 361 of the operation pad 308 is pressed, the operation pad input interface 356 of the video controller 310 recognizes the operation of the panoramic camera button 361. Then the transmission video signal selection interface 354 directs the transmission video signal selector 324 to select the video signal 333 output from the panoramic camera 303a. When a motor-driven camera button 362 of the operation pad 308 is pressed, the operation pad input interface 356 recognizes the operation. Then the transmission video signal selection interface 354 directs the transmission video signal selector 324 to select the video signal 334 output from the motor-driven camera 303b. The selected video signal is handled as the transmission video signal 332. The video signal transmitter 317 multiplexes the transmission video signal 332 with other signals and sends the resultant signal over the ISDN network 318.

When the "transmitting picture" button 363 of the operation pad 308 is pressed, the operation pad input interface 356 recognizes the operation. This is followed by the CPU 350 directing the monitoring video signal selection interface 355 to switch the monitoring video signal selector 325 so that it outputs the video signal 332 to the monitor 300. This means that, when an operator presses the transmitting picture button on the operation pad, the picture captured by the panoramic camera or by the motor-driven camera located at the present location is displayed on the monitor 300.

When the "received picture" button 384 of the operation pad 308 is pressed, on the other hand, the operation pad input interface 356 recognizes the operation. Then under the direction of the CPU 350, the monitoring video signal selection interface 355 directs the monitored video signal selector 325 to output the video signal 331 which is received from the video signal transmitter 317 to the monitor 300. This means that, when an operator presses the "received picture" button, the video signal received from the remote terminal (remote location) is displayed on the monitor 300.

When the "zoom-in" button 365 or the "zoom-out" button 366 of the operation pad 308 are pressed, the camera control interface 353 directs the motor-driven camera 303b to zoom in or zoom out, respectively. When the "far" button 387 or the "near" button 388 of the operation pad 308 are pressed, the camera control interface 353 directs the motor-driven camera 303b to focus at a distant point or at a near point, respectively. When the "up", "down", "left" or "right" button 369–372 of the operation pad 308 are pressed, the camera control interface 353 directs the motor-driven camera 303b to the specified direction.

When one of the preset buttons 373 through 376 (P1 through P4), is pressed, the operation pad input interface 356 recognizes the operation and causes the camera control interface 353 to control the motor-driven camera 303b according to the camera view information (operation information: focal length of the zoom lens, direction on focusing (far, near) and camera orientation) stored in the memory 351 in correspondence to the preset buttons. In the case where the registration button 377 is pressed, immediately followed by the pressing of one of the preset buttons P1 through P4, the operation pad input interface 356 recognizes the operation so that the CPU 350 stores the information such as camera angle and zooming which are set at that time in the memory 351 as the camera view information in correspondence to the preset button which is pressed.

In order to conduct a video teleconference session by using such a video transmission apparatus, video teleconference terminals located at the present and remote locations provided with the functions of the transmitter station and receiver station are connected so that each party can view the image of another party. The operation of transmitting video signals from one terminal to the other terminal will be described below in detail.

To transmit video signals from the transmitting station to the receiving station, an operator at the transmitting station presses the "panoramic camera" button 361 or the "motor-driven camera" button 362 of the operation pad 303 while an operator at the receiving station presses the "received picture" button 364 on the operation pad 303. This causes the transmission video signal selector 324 of the transmitting station to select the video signal from either the panoramic camera 303a or the motor-driven camera 303b according to the instruction from the video controller 310, and to output the signal as the transmission video signal 332 to the video signal transmitter 317. The video signal transmitter 317 of the transmitting station multiplexes the transmission video signal 332 with other signals and sends the resultant signal over the digital network 318.

The video signal transmitter 317 of the receiving station which has received the signal from the transmitting station via the network 318 demultiplexes the received signal and arranges it as the received video signal 331, then outputs the received video signal 331 to the monitoring video signal selector 325. Then, because the "received picture" button 364 of the operation pad 308 is pressed, the monitoring video signal selector 325 outputs the received video signal 331 to the monitor 300. As a result, the monitor 300 of the receiving station displays the images sent by the transmitting station.

In such a conventional video teleconference terminal, the panoramic camera 303a, the motor-driven camera 303b and the monitor 300 are all designed to handle pictures having an aspect ratio of 4:3. Meanwhile, recently there has been a strong demand for the use of a wide picture format having an aspect ratio of 16:9, as well as the ordinary picture format of 4:3 aspect ratio, in the field of video teleconferencing.

However, when cameras and monitors having different aspect ratios are used, such as a standard camera having an aspect ratio of 4:3 for the motor-driven camera 303b, a wide camera having an aspect ratio of 16:9 for the panoramic camera 303a and a wide monitor having an aspect ratio of 16:9 for the monitor 300, for example, in the video teleconference terminal, there have been such problems as described below. These problems will be described with reference to FIG. 13A and FIG. 13B.

In FIG. 13A and FIG. 13B, the panoramic camera 303a is a wide camera having an aspect ratio of 16:9, and the motor-driven camera 303b is a standard camera having an aspect ratio of 4:3. The monitor which displays the pictures at the receiving terminal is a wide monitor having an aspect ratio of 16:9.

Usually it is impossible to send video signals of different aspect ratios over the same communication line. For this reason, the video signal transmitted over the communication line is made to have the aspect ratio of 4:3 in FIG. 13A and FIG. 13B. Therefore pictures captured by the wide camera having the aspect ratio of 16:9 are compressed in the horizontal direction and converted to a video signal having the aspect ratio of 4:3.

FIG. 13A shows a case where video signals having an aspect ratio of 4:3 are displayed on the wide monitor 100 as pictures having the aspect ratio of 4:3. FIG. 13B shows a case where video signals having the aspect ratio of 4:3 are displayed on the wide monitor 100 after being expanded horizontally to the aspect ratio of 16:9.

In FIG. 13A, the motor-driven camera 303b captures the image in a field of view 400 with the aspect ratio of 4:3 to generate a video signal 401 having the aspect ratio of 4:3. The wide camera 303a compresses a field of view 403 having an aspect ratio of 16:9 to generate a video signal 404 having an aspect ratio of 4:3. The wide monitor 100 displays the pictures while switching between the video signals from the wide camera 303a and the motor-driven camera 303b.

As shown in FIG. 13A, when the video signal having an aspect ratio of 4:3 is displayed on the wide monitor 100 as a picture having an aspect ratio of 4:3, the picture 402 from the motor-driven camera 303b is displayed without distortion, although a picture 405 from the wide camera 303a suffers from distortion of vertical elongation.

On the other hand, when the input video signal is displayed on the wide monitor 100 after being expanded horizontally to an aspect ratio of 16:9 as shown in FIG. 13B, a picture 415 from the wide camera 303a is displayed without distortion although the picture 412 from the motor-driven camera 303b suffers from distortion of horizontal elongation.

The conventional video teleconference terminal has a drawback in that, when pictures of different aspect ratios are transmitted together, images of one aspect ratio are displayed with distortion on the receiving terminal and cannot be reproduced correctly, as described above.

Also in such applications as video teleconferencing, when a person is zoomed in or using a standard camera, for example, it is better to display the picture with the aspect ratio of 4:3 even on a wide monitor, as shown in FIG. 14A, because an image of one person can be better recognized with the aspect ratio of 4:3. When a picture of three or four persons are displayed as shown in FIG. 14B, however, human figures become relatively small in a picture frame having an aspect ratio of 4:3 thereby leaving relatively large unnecessary areas at the top and bottom of the screen, thus canceling the advantage of using the wide monitor. When a picture of a single person is displayed with an aspect ratio of 4:3 and an image of three or four persons is displayed over the full screen of the wide monitor having an aspect ratio of 16:9, on the other hand, troublesome operations of switching between different aspect ratios are required.

SUMMARY OF THE INVENTION

The present invention aims at solving the problems of the related art described above, and has an object of providing a video transmission apparatus which is capable of transmitting video signals captured by a plurality of cameras having different aspect ratios at the transmitting terminal so that the pictures can be displayed without distortion at the receiving end.

Another object of the invention is to provide a video transmission apparatus which is capable of automatically switching the aspect ratio of the picture to be displayed on a monitor according to the zooming operation of the camera.

Further, another object of the invention is to provide a video transmission apparatus which is capable of transmitting analog video signals, including an aspect ratio identification signal and video signals captured by cameras, while switching between the signals, so that the pictures can be displayed without distortion at the receiving end.

In order to achieve the aforesaid objects, the video transmission apparatus of the invention comprises:

video signal generating means for generating video signals;

display control signal generating means for generating display control signal which indicates the aspect ratio for displaying the video signals;

transmitting means for transmitting the video signal and the display control signal over a communication line, while relating them to each other;

receiving means for receiving the video signal and the display control signal from the communication line; and video display means for displaying the video signal received by the receiving means with an aspect ratio indicated by the display control signal received by the receiving means.

With this configuration, because the transmitting terminal transmits the video signal and the display control signal which indicates the aspect ratio for displaying the video signal while relating them to each other, the receiving terminal is capable of displaying the pictures corresponding to the video signal with the correct aspect ratio according to the display control signal.

In another video transmitting apparatus of the invention, in the case where the video signal generating means in the first embodiment described above is a camera having a zoom lens, the video signal generating means has means to output the magnification factor of the picture, while the display control signal generating means has comparing means, for comparing the image magnification factor of the zoom lens with a predetermined reference value, and signal generating means for generating the display control signal which indicates different aspect ratios depending on whether the image magnification factor is greater or less than the reference value, based on the result of comparison. With this constitution, the aspect ratio of displaying the video signal can be automatically switched according to the extent of the field of view of the camera equipped with a zoom lens, making it possible to display the picture with a feeling of presence according to the extent of the field of view of the picture.

Another video transmission apparatus of the invention comprises:

a plurality of video signal generating means each for generating video signals representing pictures of different aspect ratios;

video selecting means for selecting one of the output video signals from the plurality of video signal generating means:

display control signal generating means for generating a display control signal which indicates the aspect ratio of the video signal selected by the video selecting means;

transmitting means for transmitting the video signal selected by the video selecting means and the display control signal generated by the display control signal generating means, over a communication line while relating them to each other;

receiving means for receiving the video signal and the display control signal from the communication line; and video display means for displaying the video signal received by the receiving means with an aspect ratio indicated by the display control signal received by the receiving means.

With this configuration, the receiving terminal is capable of displaying the pictures corresponding to the video signal with the correct aspect ratio specified by the display control signal, even when a plurality of video signals representing pictures of different aspect ratios are received from the transmitting terminal.

Further, another video transmission apparatus of the invention comprises:

at least one video signal generating means for generating video signals representing pictures of different aspect ratios;

external video signal input means for receiving an external video signal including an aspect ratio identification signal, which extracts the aspect ratio identification signal from the external video signal and outputs the external video signal and the aspect ratio identification signal which have been extracted;

video selecting means for selecting one of the output video signals from the video signal generating means and the external video signal input means;

display control signal generating means which, when a video signal selected by the video signal selecting means is that from one of the video signal generating means, generates a display control signal which indicates the aspect ratio of the selected video signal and, when a video signal selected by the video signal selecting means is that from the external video signal input means, generates a display control signal which indicates the aspect ratio corresponding to an aspect ratio identification signal extracted from the external video signal;

transmitting means for transmitting the video signals selected by the video selecting means and the display control signals generated by the display control signal generating means, over the communication line while relating them to each other;

receiving means for receiving the video signals and the display control signals from the communication line; and video display means for displaying the video signal received by the receiving means with an aspect ratio indicated by the display control signal received by the receiving means.

With this configuration, the receiving terminal is capable of displaying the pictures corresponding to the video signal without distortion, even when a video signal including an aspect ratio identification signal is input from an external camera or the like to the video transmission apparatus of the transmitting terminal, and the video signal from the external source is transmitted to the video transmission apparatus of the receiving terminal.

DETAILED DESCRIPTION OF THE PREFERRED EMBODIMENTS

Embodiment 1

The first embodiment of the invention will be described below.

In this embodiment, a display control signal indicating the mode of display is added to the video signal while the associated display control signal and the video signal are switched as a pair, thereby displaying the pictures of different aspect ratios without distortion.

Figure 1:
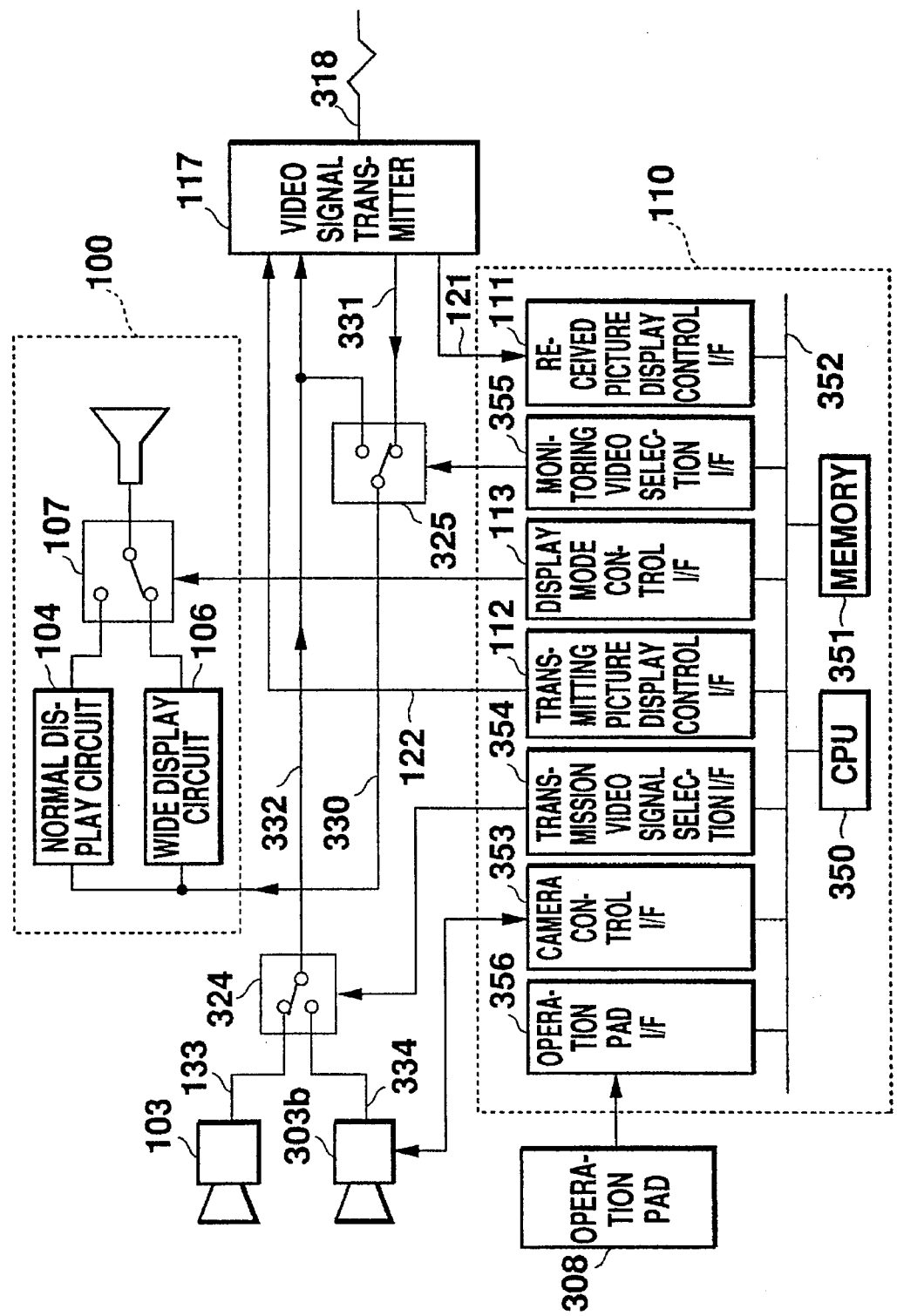
FIG. 1 is a block diagram showing the configuration of the first embodiment of the video transmission apparatus of the invention.

FIG. 1 shows the first embodiment of the video transmission apparatus of the invention. In FIG. 1, components similar to those of the apparatus shown in FIG. 11 will be identified with the same numerals, and description thereof will be omitted.

Figure 2:
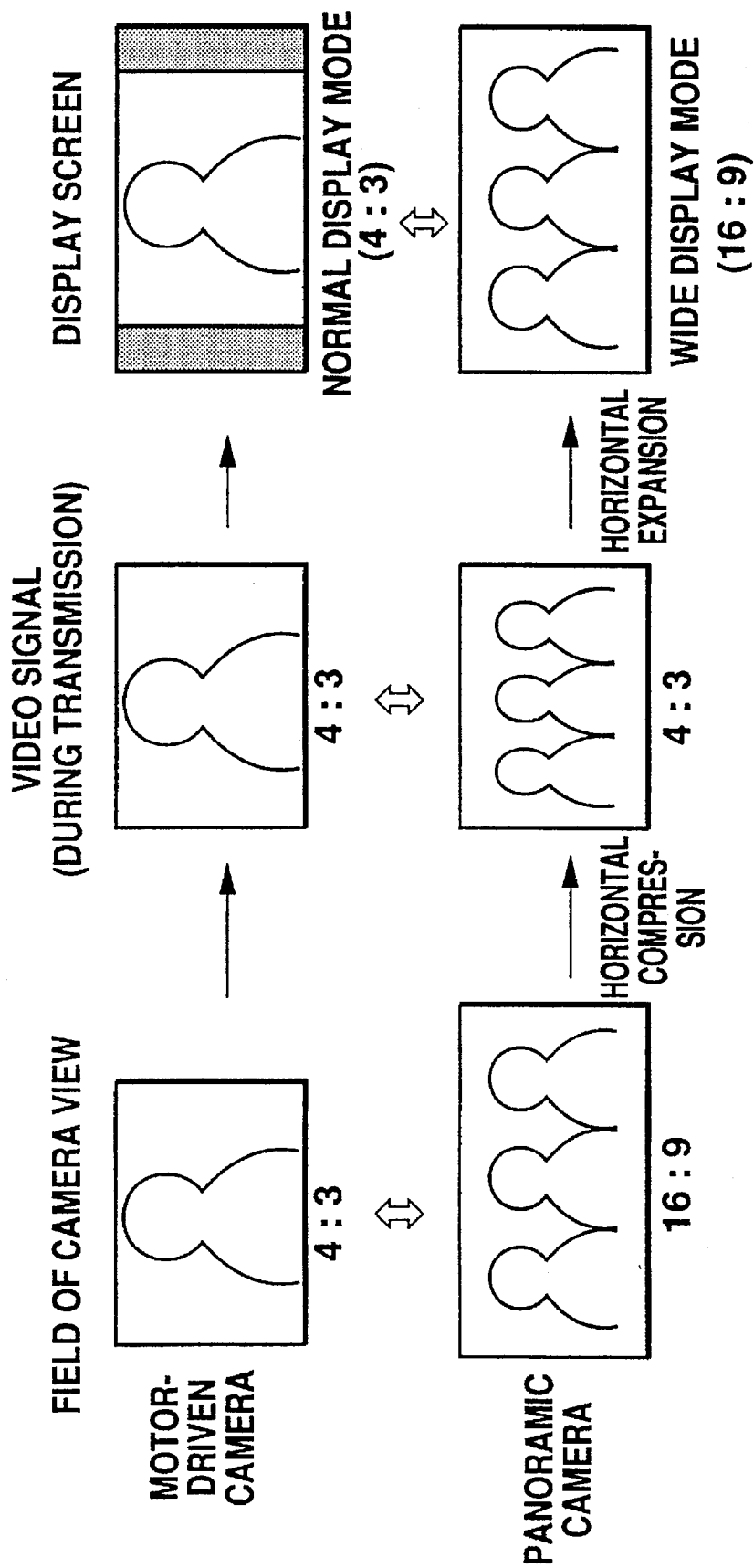
FIG. 2 is a drawing explaining the display modes (normal display mode and wide display mode) in the first embodiment.
Figure 10:
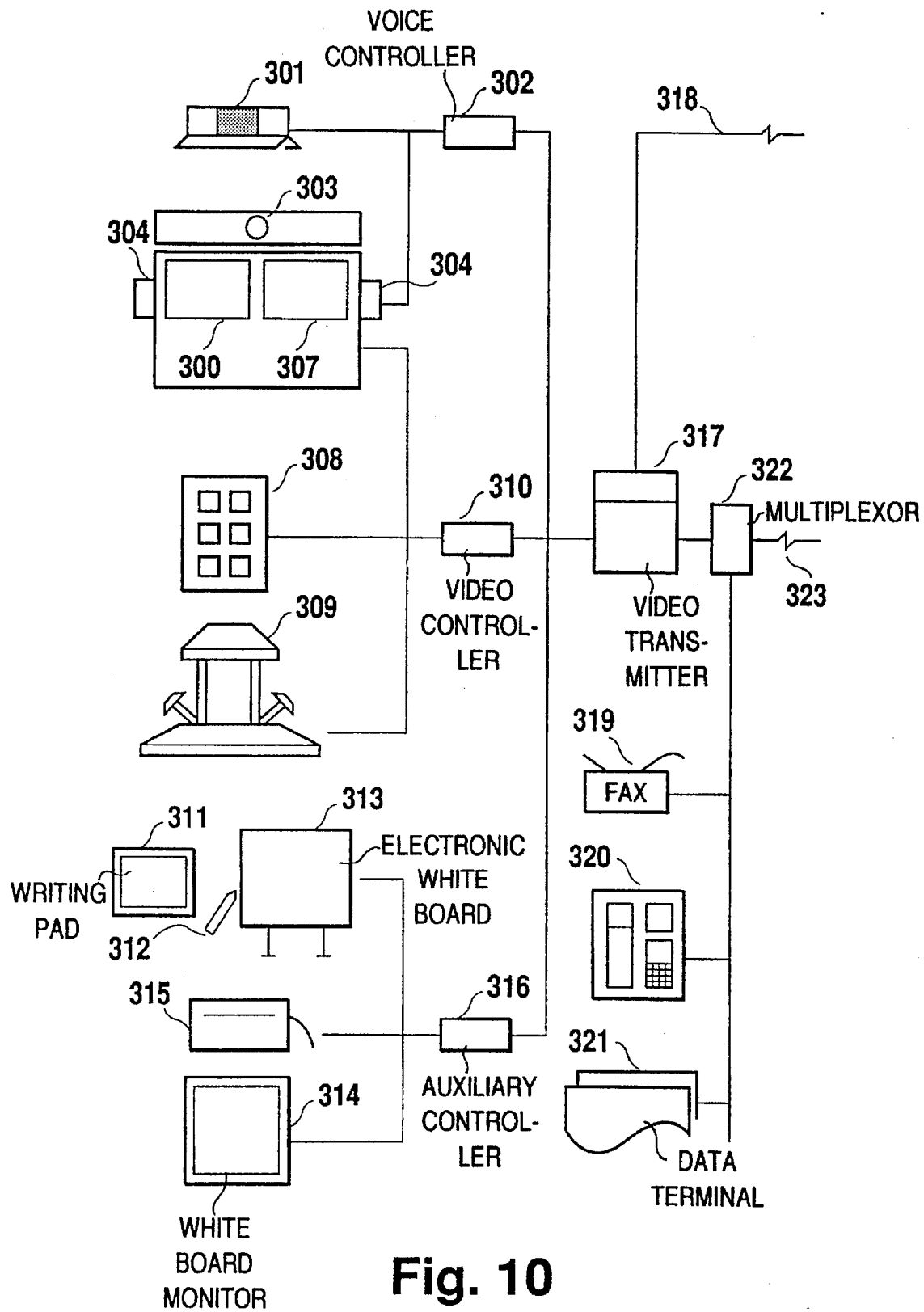
FIG. 10 is an explanatory drawing of an example of an ordinary configuration of video teleconference terminals.

In FIG. 1, a wide monitor 100 is used to display motion pictures of human figures and other objects, and has an aspect ratio of 16:9. The wide monitor 100 corresponds to the human figure monitor 300 shown in FIG. 10. A normal display circuit 104 is used to display a monitoring video signal 330 on the wide monitor 100 with an aspect ratio of 4:3. When the video signal 330 is displayed by using the normal display circuit 104, the wide monitor 100 displays in the normal display format as shown in FIG. 2. A wide display circuit 106 is used to expand the video signal 330 having the aspect ratio of 4:3 to adapt to the aspect ratio of 16:9 and display the signals on the wide monitor 100. When the video signal 330 is displayed by using the wide display circuit 106, the wide monitor 100 displays in the wide display format as shown in FIG. 2. A display selector circuit 107 is used to select either the output video signal from the normal display circuit 104 or the output video signal from the wide display circuit 106, and is controlled by the display mode control interface(I/F) 113 of the video controller 110. Then the video signal selected by the display selector circuit 107 is displayed on the wide monitor.

A wide camera 103 is generally used to take pictures of the entire conference room including all participants of the conference. The wide camera 103 takes the picture in a field of view having an aspect ratio of 16:9 and horizontally compresses the image to an aspect ratio of 4:3, thereby generating a video signal to be transmitted. The wide camera 103 is, for example, a camera employing an anamorphic lens having different horizontal magnification (a lens that produces a vertically elongated image by optically compressing the image horizontally). The video controller 110 corresponds to the video controller 310 of the related art. The video controller 110 has, in addition to the components of the video controller 310 of the related art shown in FIG. 11, a received picture display control interface 111, a transmitting picture display control interface 112 and a display mode control interface 113.

The received picture display control interface 111 takes in the received display control signal 121 from the video signal transmitter 117 and sends it to the CPU 350. The transmitting picture display control interface 112 outputs the transmitting display control signal 122 to the video signal transmitter 117. The monitor display control interface 113 directs the display selector circuit 107 as to which of the outputs from the normal display circuit 104 and from the wide display circuit 106 is to be transmitted.

Figure 11:
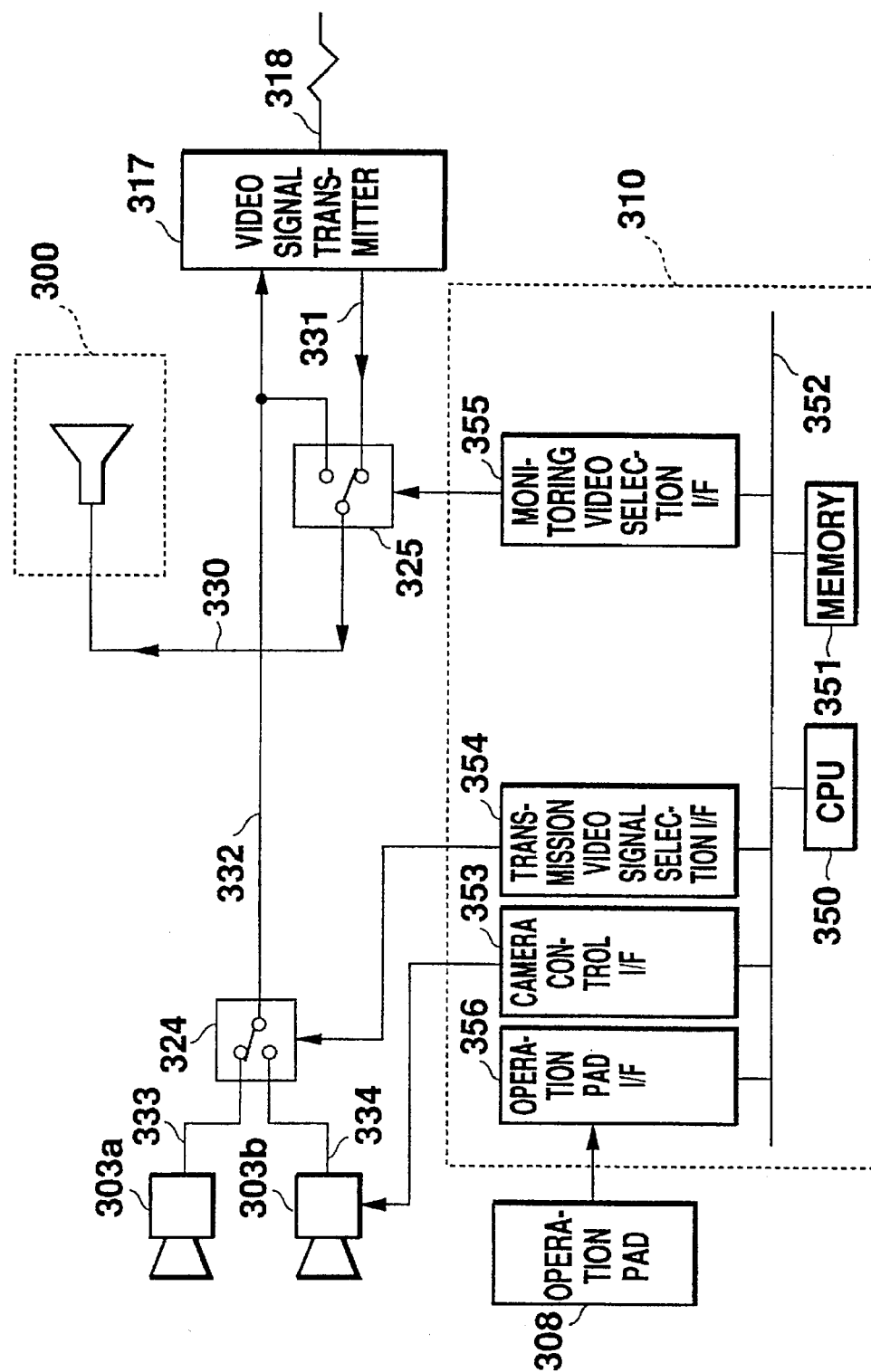
FIG. 11 is a block diagram showing the configuration of the video transmission apparatus of the video teleconference terminal of the related art.

The video signal transmitter 117 has, in addition to the functions similar to those of the video signal transmitter 317 of FIG. 11, a function to multiplex the display control signal with the video signals and to transmit the resultant signal. That is, the video signal transmitter 117 multiplexes the transmission video signal 332 with the transmission display control signal 122 and transmits the resultant signal over the network 318. The video signal transmitter 117 also demultiplexes the signal received from the network 318 into a received display control signal 121 and a received video signal 331, and outputs them to the received picture display control interface 111 and the monitoring video signal selector 325, respectively.

Now the operation of the apparatus of the invention shown in FIG. 1 will be described below. Description of components similar to those of the related art shown in FIG. 11 will be omitted.

In FIG. 1, when the "panoramic camera" button 361 of the operation pad 308 (refer to FIG. 12) is pressed, the CPU 350 directs the operation pad input interface 356 to recognize the operation of the "panoramic camera" button 361, after which the CPU 350 directs the transmission video signal selection interface 354 to make the transmission video signal selector 324 select the video signal 133 which is sent from the wide camera 103. Thus the video signal 133 sent from the wide camera 103 is output to the video signal transmitter 117 as a transmission video signal 332. At the same time, under the direction of the CPU 350, the transmission display control interface 112 outputs the transmission display control signal 122 having a value indicating "wide display mode" to the video signal transmitter 117.

When the "motor-driven" camera button 382 of the operation pad 308 is pressed, the operation pad input interface 356 recognizes the operation, after which the transmission video selection interface 354 directs the transmission video selector 324 to select the video signal 334 which is sent from the motor-driven camera 303. Thus the video signal 334 is output to the video signal transmitter 117 as the transmission video signal 332. At the same time, the transmitting picture display control interface 112 outputs the transmission display control signal 122 having a value indicating "normal display mode" to the video signal transmitter 117.

The video signal transmitter 117 multiplexes the video signal to be transmitted 332 with the transmission display control signal 122 and other signals and sends the resultant signal over the network 318.

The video signal transmitter 117 at the receiving terminal demultiplexes the signal received from the network 318, then outputs the receiving video signal 331 to the monitoring video signal selector 325 and outputs the received display control signal 121 to the received display control interface 111.

Then as the "transmitting picture" button 363 is pressed on the operation pad 308, the operation pad input interface 356 recognizes the operation of the transmitting picture button 363. This causes, under the control of the CPU 350, the monitoring video selection interface 355 to direct the monitor video signal selector 325 to send the video signal 332 from the transmission video signal selector 324 to the wide monitor 100. Consequently, the participants in the video teleconference session can monitor the pictures transmitted from their terminal.

When the "panoramic camera" button 361 is pressed, the operation pad input interface 356 recognizes the operation so that the transmission video signal selection interface 354 switches to the transmission video signal selector 324 so that the video signal 133 from the panoramic camera is sent to the video signal transmitter 117 as the video signal 332. At the same time, the display mode control interface 113 directs the monitoring display selector circuit 107 to select the output from the wide display circuit 106. This causes the transmission video signal 332 to be displayed in wide format on the wide monitor 100.

When the "motor-driven camera" button 362 is pressed, on the other hand, the operation pad input interface 356 recognizes the operation. As a result, the transmission video signal selection interface 354 directs the transmission video signal selector 324 to output the video signal 334 from the motor-driven camera 303b as the video signal 332. At the same time, the monitoring display control interface 113 directs the monitoring display selector circuit 107 to select the output from the normal display circuit 104. This causes the video signal 332 to be displayed in the normal format (aspect ratio 4:3) on the wide monitor 100.

To sum up, pressing the "panoramic camera" button 361 after the "transmitting picture" button 363 causes wide format display of the picture captured by the panoramic camera of the present station on the wide monitor 100. While pressing the "motor-driven camera" button 362 after the "transmit picture" button 363 causes normal format display of the picture captured by the motor-driven camera of the present station on the wide monitor 100.

When the "received picture" button 364 is pressed on the operation pad 308, the operation pad input interface 356 recognizes the operation. Then the monitoring video signal selection interface 355 directs the monitoring video signal selector 325 to switch so that the received video signal 331 from the video transmitter 117 is output to the wide monitor 100. At the same time, the received picture display control interface 111 reads the received display control signal 121. When the value of the received display control signal which has been read is "wide display", the CPU 350 directs the display selector circuit 107 via the monitor display mode control interface 113 to select the output from the wide display circuit 106. As a result, the monitor 100 displays the picture received from the other terminal in wide format. When the value of the received display control signal which has been read is "normal display", the CPU 350 directs the display selector circuit 107 via the monitor display control interface 113 to select the output from the normal display circuit 104. As a result, the monitor 100 displays the image received from the other terminal in normal format.

In this embodiment, as described above, pressing the "received picture" button 364 on the operation pad causes the video signal received from the other station to be displayed on the wide monitor 100 with wide format or normal format being automatically selected.

To transmit pictures by linking the transmitting and receiving stations with a communication line, the panoramic camera or motor-driven camera button is pressed on the operation pad 308 at the transmitting station, and the "received picture" button 364 is pressed on the operation pad 308 at the receiving station. Then, under the control of the transmission video signal selection interface 354, the transmission video selector 324 at the transmitting station selects the video signal from either the wide camera or the motor-driven camera and sends it to the video transmitter 117 as the video signal to be transmitted 332. At the same time, as long as the "panoramic camera" button 361 has been pressed on the operation pad at the transmitting terminal, the transmission display control interface 112 generates a display control signal 122 having a value indicating wide display mode and sends the signal 122 to the video signal transmitter 117. When the "motor-driven camera" button 362 has been pressed on the operation panel, on the other hand, the transmission display control interface 112 generates the display control signal 122 having a value indicating normal display mode, and sends this signal 122 to the video transmitter 117.

The video transmitter 117 of the transmitting terminal multiplexes the video signal to be transmitted 332 and the transmission display control signal 122 with other signals (an audio signal, for example) and sends the resultant signal to the network 318.

The video signal transmitter 117 of the receiving terminal demultiplexes the signal received from the network 318 and extracts the received video signal 331 and the received display control signal 121. The received video signal 331 is output to the monitoring video signal selector 325 and the received display control signal 121 is output to the received picture display control interface 111.

At this time, as the "received picture" button 364 is pressed on the operation pad 308 at the receiving terminal, the monitoring video signal selector 325 at the receiving terminal outputs the received video signal 331 on the wide monitor 100 of the receiving terminal. The wide monitor 100 of the receiving terminal displays the received video signal 331 in the wide format or normal format according to the control by the display mode control interface 113 of the video controller 110.

When the "motor-driven" camera 362 is selected at the transmitting terminal, for example, because the display control signal 122 added to the transmitting video signal 332 has a value indicating "normal display", the receiving terminal receives the display control signal indicating "normal display". As a result, at the receiving terminal, the monitor display control interface 113 acts to effect the selecting and displaying of the output video signal from the normal display circuit 104 on the monitor 100 (that is, the picture is displayed on the monitor 100 with the aspect ratio of 4:3 at the receiving terminal). Also when the wide camera (panoramic camera) is selected at the transmitting terminal, because the display control signal 122 added to the transmission video signal 332 has a value indicating wide display mode, the receiving terminal receives the display control signal indicating "wide display mode" and consequently the output video signal of the wide display circuit 106 is selected and displayed on the monitor 100 as a result of the actions of the display mode control interface 113 at the receiving terminal (that is, a picture having an aspect ratio of 16:9 is displayed on the wide monitor 100 at the receiving terminal).

To sum up, pictures of aspect ratio 4:3 captured by the motor-driven camera 303b are converted to video signals of aspect ratio 4:3 and transmitted, then displayed on the monitor 100 of the present terminal or on the monitor of the receiving terminal in the normal format (aspect ratio 4:3), as shown in FIG. 2. On the other hand, pictures having an aspect ratio of 16:9 captured by the panoramic camera (wide camera) 103 are converted to video signals having an aspect ratio of 4:3 (compression in the horizontal direction) by the camera and transmitted, then expanded horizontally by the wide display circuit 106 of the present or the receiving terminal and displayed on the monitor 100 of the present terminal or on the monitor of the receiving terminal in the wide format.

According to this embodiment, as described above, the receiving terminal is capable of automatically selecting the wide display circuit or the normal display circuit and displaying the video signal on the monitor with the proper aspect ratio suited thereto, even when video signals representing pictures of different aspect ratios are received from the transmitting terminal.

Basic configuration and operation of the first embodiment have been described above. In the first embodiment, digital multiplexing transmission or analog multiplexing transmission may be employed as the method of multiple transmission by the video transmitter 117. Operation of the video transmitter 117 when digital multiplexing transmission is employed will now be described.

During transmission, the video transmitter 117 carries out digital compression encoding on the video signal to be transmitted 332 and multiplexes the digital video signal with a transmission display control signal 122 which is received from the transmission display control interface 112, and sends the resultant signal onto the digital ISDN network 318. When receiving, the video transmitter 117 demultiplexes the signal received from the ISDN network 318 into a receiving display control signal 121 and a digital video signal, then decodes the digital video signal and expands it to generate a receiving video signal 331. The received display control signal 121 is output to the received picture display control interface 111 and the received video signal 331 is output to the monitoring display selection circuit 325.

Figure 3:
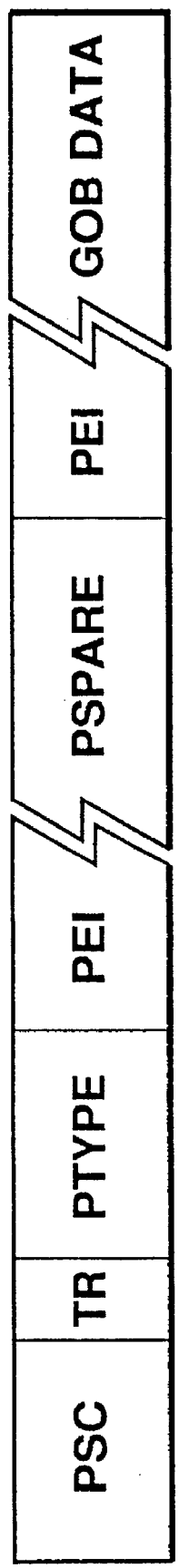
FIG. 3 is a drawing explaining the frame format of video signals specified in H261 of the CCITT recommendation.

For the method of digital multiplexing transmission (transmission of a signal obtained by multiplexing the video signals which have been subjected to digital compression and encoded with the display control signal), there are two methods, corresponding to the CCITT recommendation H261 and H221. FIG. 3 shows an example of a frame format for signals when the H261 system is employed. In FIG. 3, PSC is a code indicating the start of picture frame, and TR is a code indicating the temporal reference of the frame No. PTYPE is a code indicating the information for the picture type of one frame, representing the information on the split screen instruction, information source format and so on. PEI is a code indicating the information on the insertion of extra data, which shows whether it is followed by an optional data area or not. PEI has a data size of 1 bit. PSPARE is a reserved information area which includes spare information in the unit of 0/8/16 ... bits. GOB (group of blocks) includes data such as video signals to be transmitted being divided into a plurality of blocks.

In order to carry out multiplex transmission in compliance with the recommendation H261 in this embodiment, a display control signal ("wide display" or "normal display") is assigned to PTYPE, and a video signal having been subjected to digital compression and encoding is assigned to GOB data, both of which are then transmitted. At this time, because the transmission display control signal 122 is added to the video signal as the aspect ratio indicating information for each picture frame, every picture frame of the transmission video signal 332 can be displayed on the monitor with a different aspect ratio.

Figure 4:
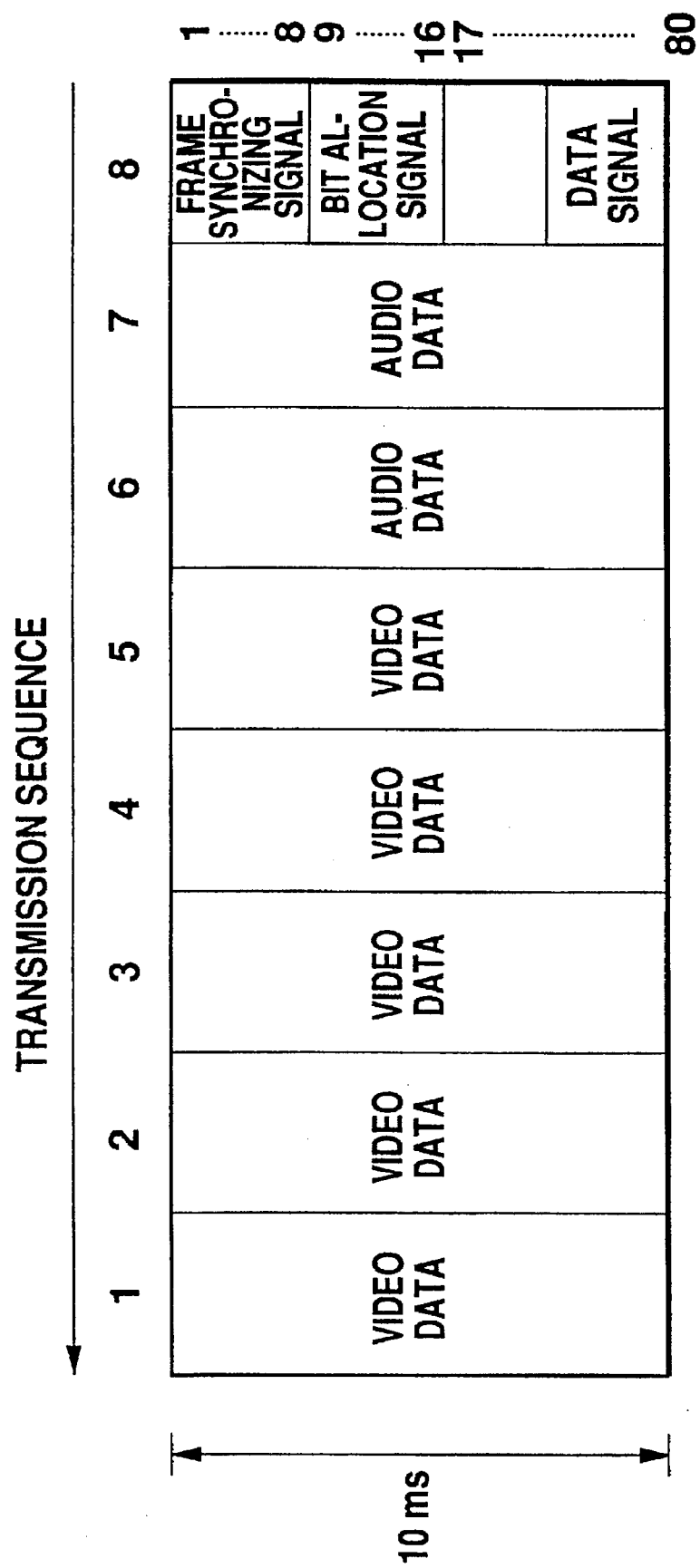
FIG. 4 is a drawing explaining the frame format of video signals specified in H221 of the CCITT recommendation.

FIG. 4 shows an example of a frame format for signals when the CCITT recommendation H221 is employed. With this format, data is handled in a unit of 8 bits, called an "octet". Data from octet No.1 through octet No.80,640 bits in all, is transmitted in 10 milli-seconds. This means that transmission according to this recommendation is carried out at a rate of 64 kbits/s. Video data after digital compression and encoding is stored in the video region of the format shown in FIG. 4, while signals for one screen are sent in a block covering a plurality of frames. The display control signal is sent while being carried by one of the bit allocation signals shown in FIG. 4. It is also possible to secure a channel for the display control signal in the data signal area of the H221 transmission frame, and send the display control signal on the channel.

As described above, digital transmission is capable of sending video and other signals which have been subjected to digital compression and encoding, thereby economically sending pictures to a remote site.

Methods of analog multiplex transmission include, by way of example, provisional standards of EIAJ (Electronic Industries Association of Japan) CPX-1202 and CPX-1204 ("Identification signal and transmission method for video signals of different aspect ratios"). According to these standards, identification signals indicating the aspect ratios are added to the analog video signals in such a way that they do not affect the video signals.

Although the video teleconference terminal described above is equipped with a camera of each of two types (panoramic and motor-driven), the types and number of cameras can be increased. When increasing the types and number of cameras, it suffices to increase the inputs to the transmission video signal selector 324 to match the number of cameras and have the video controller 110 carry out control according to the types.

Although the wide camera and the wide monitor have an aspect ratio of 16:9 and the motor-driven camera has an aspect ratio of 4:3 in this embodiment, it will be easily understood that the invention is applicable also to a case where cameras and monitors of aspect ratios different from those described above are used.

Embodiment 2

While two cameras are provided as the picture input devices in the first embodiment described above, a picture signal receiving device which receives the video signal with an aspect ratio identification signal added thereto (for example, a video signal from a camera or a video deck of the EIAJ standard) is used instead of one of the cameras in the second embodiment.

According to the provisional standard CPX-1202 and CPX-1204 (Identification signal and transmission method for video signals of different aspect ratios) stipulated by the Electronic Industry Association of Japan (EIAJ), as described above, analog video signals are sent together with identification signals indicating the aspect ratios added thereto. Therefore, a camera which complies with this standard outputs an analog video signal including an aspect ratio identification signal. This embodiment shows an example of a configuration where a camera of such a standard as described above is connected, as picture input means, to a video transmission apparatus.

Figure 5:
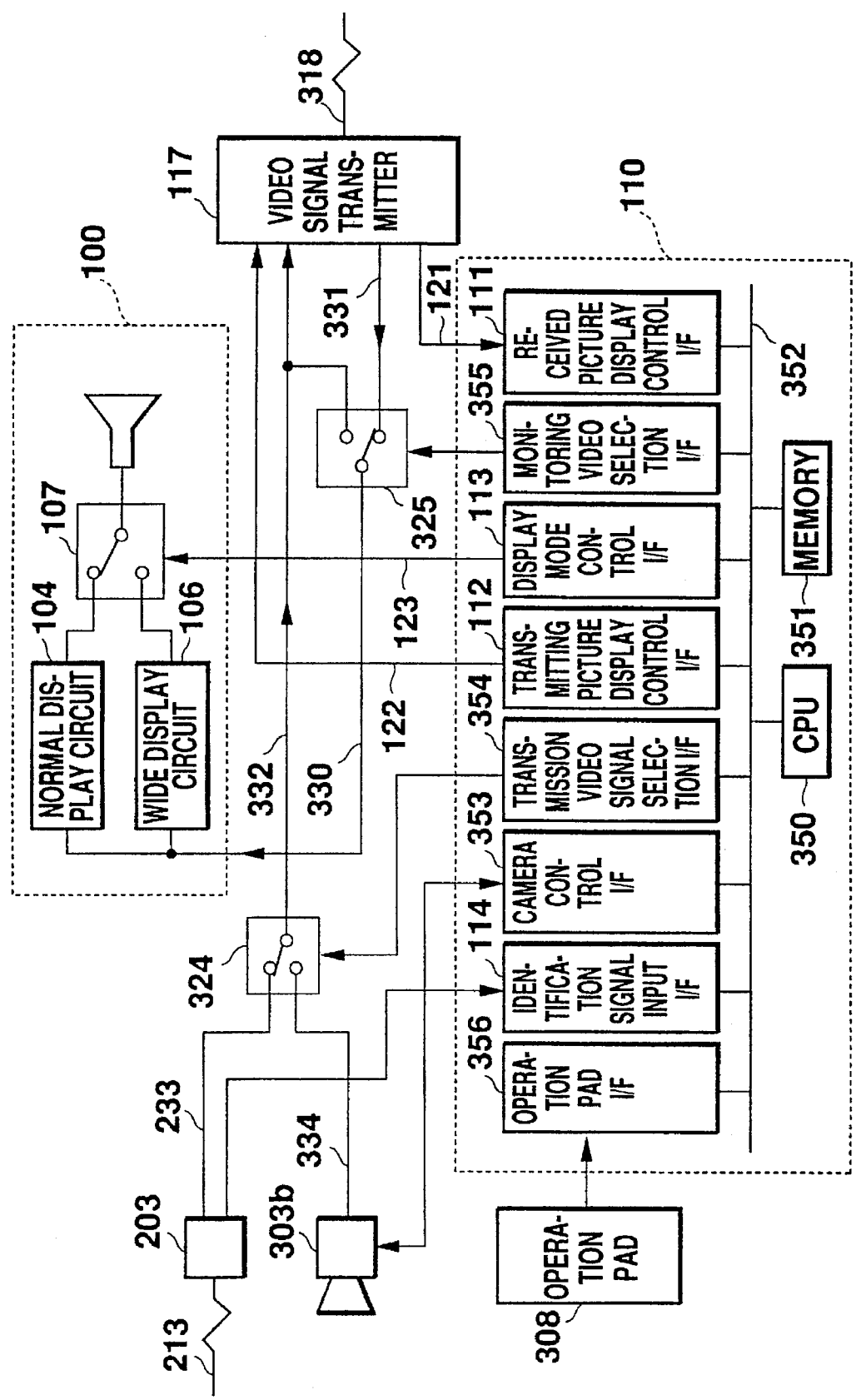
FIG. 5 is a block diagram showing the configuration of the second embodiment of the video transmission apparatus of the invention.

FIG. 5 is a block diagram showing the configuration of the second embodiment. In FIG. 5, components identical with those shown in FIG. 1 are denoted with the same numerals and description thereof will be omitted.

Figure 12:
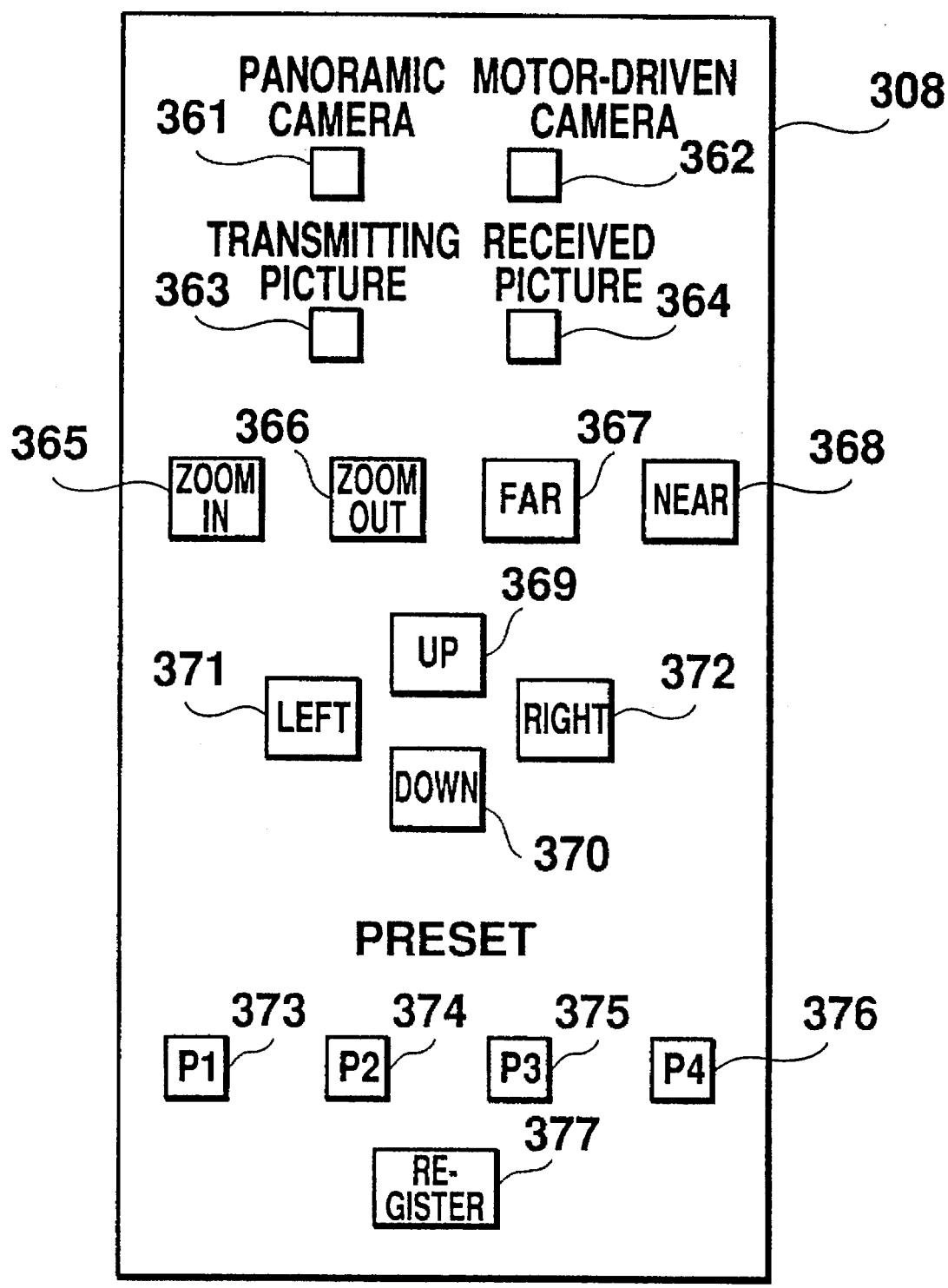
FIG. 12 is a drawing explaining the key layout of the operation pad of the video transmission apparatus for the video teleconference terminal of the related art.
Figure 13A:
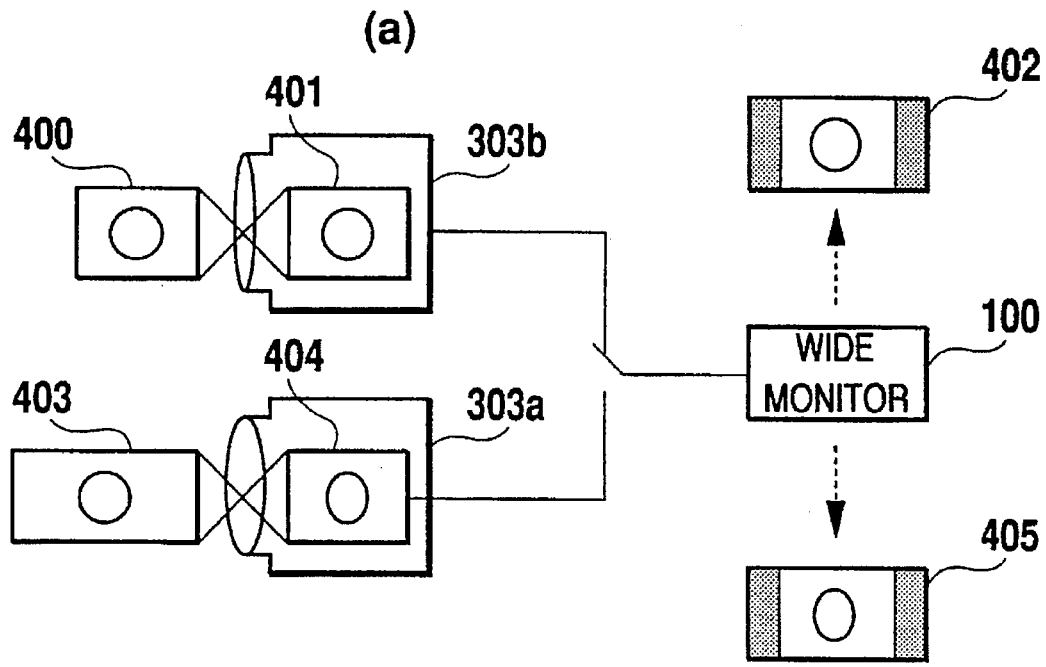
FIG. 13A is a drawing showing the monitor screen whereon pictures of different aspect ratios are displayed in the video transmission apparatus of the related art.
Figure 13B:
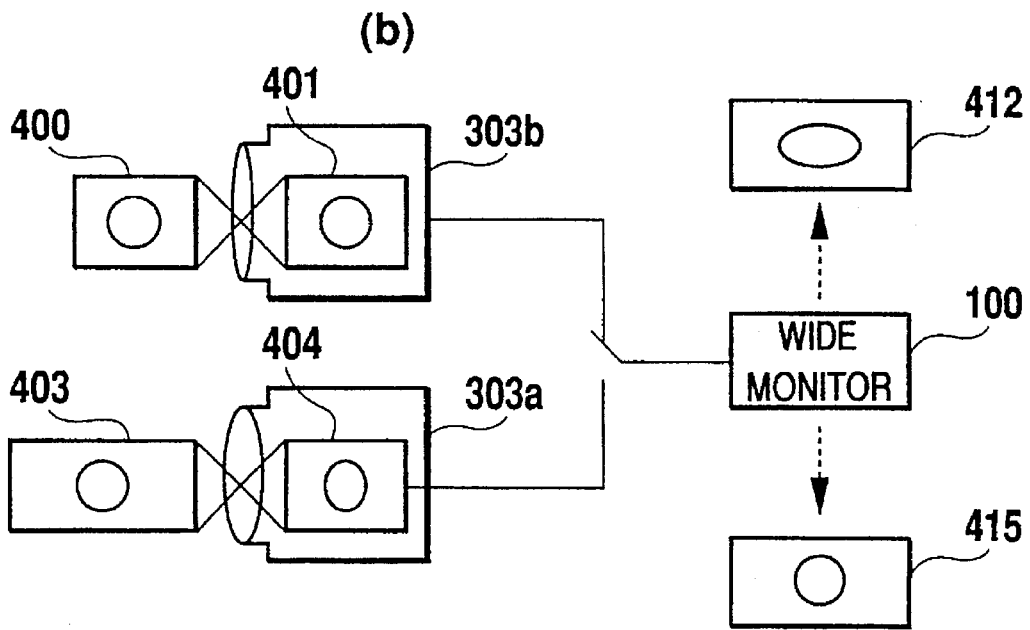
FIG. 13B is a drawing showing the monitor screen whereon pictures of different aspect ratios are displayed in the video transmission apparatus of the related art.
Figure 14A:
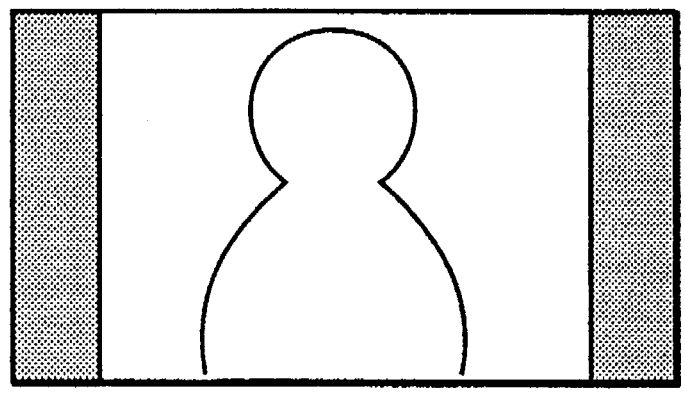
FIG. 14A is a drawing showing the monitor screen whereon an image of one person is displayed with the aspect ratio of 4:3.
Figure 14B:
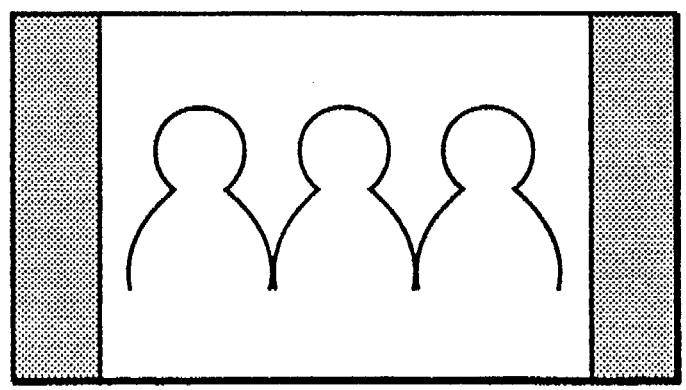
FIG. 14B is a drawing showing the monitor screen whereon an image of three persons is displayed with the aspect ratio of 4:3.

The configuration of the second embodiment differs from that of the first embodiment in that a picture signal receiving apparatus 203 is used instead of the wide camera 103. In line with this difference, an identification signal input interface 114 is added to the video controller 110 in this embodiment. Also it is necessary in this embodiment, to make the key layout of the operation pad a little different from that shown in FIG. 12. That is, because the picture receiving apparatus 203 is used instead of the panoramic camera in this embodiment, a button for the picture signal receiving apparatus is required instead of the button for the panoramic camera. Therefore the button 361 shown in FIG. 12 is used as the picture signal reception button (the description that follows assumes that "external input" is inscribed on top of the button 361 of FIG. 12 instead of "panoramic camera").

In FIG. 5, line 213 is a video signal line for the transmission of video signals together with the aspect ratio identification signals added thereto, and is used to transmit signals from external cameras or video decks of the EIAJ standard. The video receiving apparatus 203 sends the video signal received from the video signal line 213 to the transmission video signal selector 324, extracts the aspect ratio identification signals from the video signals to judge which aspect ratio is indicated by the extracted aspect ratio identification signal (analog signal), and outputs the result of judgment (digital signal) to the identification signal input interface 114. The identification signal input interface 114, under the control of the CPU 350, reads the result of judging the aspect ratio which is output from the video receiving apparatus 203.

Now the process of sending the analog video signal with the aspect ratio identification signal added thereto from the transmitting terminal to the receiving terminal and displaying the pictures will be described below with reference to FIG. 5.

In FIG. 5, when the "external input" button 361 (in place of the "panoramic camera" button) of the operation pad 308 is pressed, first the operation pad input interface 356 recognizes that operation under the direction of the CPU 350. Then the transmission video signal selection interface 354 directs the transmission video signal selector 324 to output the video signal 233 with the aspect ratio identification signal added thereto to the video transmitter 117 as the video signals 332. On the other hand, the identification signal input interface 114 reads the result of judgment of the aspect ratio identification signal which is output from the video receiver 203. The CPU 350 converts the result of judgment which has been read into a display control signal and outputs this signal as the transmission display control signal 122 via the transmission display control interface 112 to the video signal transmitter 117. The video signal transmitter 117 in turn multiplexes the transmission video signal 332 with the transmission display control signal 122 and sends the resultant signal over the network 318.

On the receiving terminal, similarly to the case of the first embodiment, the received signal is demultiplexed into a video signal 331 and the received display control signals 121, and the video signal 331 is displayed on the wide monitor 100 according to the aspect ratio indicated by the received display control signal 121.

There are such methods as described below to judge the aspect ratio of display from the analog aspect ratio identification signal of the EIAJ standard described above at the video receiver 203. To judge the identification signal specified in the EIAJ CPX-1202, the DC level of a C signal (chrominance signal) from the S video terminal (input terminal for luminance signal and chrominance signal) is detected, and judgment is made based on the DC level. Namely, when the DC level is 0 V, the video signal is judged to have an aspect ratio of 4:3 and accordingly the video receiver 203 outputs a digital signal representing this result. Upon receipt of this result of judgment, the video controller 110 sets the value of the display control signal to the value of normal display mode. When the DC level is in a range from 2.5 V to 5 V, on the other hand, the video signal is judged to have an aspect ratio of 16:9. As a result, the video controller 110 sets the value of the display control signal to the value of wide display mode.

In the case where the identification signal specified in the EIAJ CPX-1204 is employed, line No.20 and line No.283, during the vertical blanking period of the luminance signals, are detected, and Judgment is made according to 20 bits of the waveform thereof.

According to this embodiment, as described above, pictures of different aspect ratios can be displayed with the respective aspect ratios even when using, instead of a camera, the picture signal receiver 203 which receives the video signal with the aspect ratio identification signal added thereto from an external camera or the like of the EIAJ standard.

Although the monitoring video signal 330 and the monitoring control signal 123 are handled as different signals as shown in FIG. 5 in this embodiment, another configuration may be employed. For example, instead of sending the monitor display control signal 123 directly to the monitor 100, such a configuration may be employed as the monitor display signal 123 is converted to an aspect ratio identification signal by an aspect ratio identification signal generator (not shown in the drawing) which is provided separately, the aspect ratio identification signal is added to the monitor video signal 330 and both signals are sent as one signal, similarly to the EIAJ standards CPX-1202 and CPX-1204. In this case, a monitor equipped with a judging device to judge the aspect ratio identification signal may be used.

In this embodiment, too, either digital multiplex transmission or analog multiplex transmission may be employed for the method of multiplex transmission of signals, similarly to the first embodiment.

Embodiment 3

A third embodiment of the invention will be described below. The third embodiment relates to a video teleconference terminal which employs a camera equipped with a zoom function as the motor-driven camera 303b, and has an object of automatically switching the aspect ratio of the picture displayed on the monitor according to the change in the field of view corresponding to the zooming operation.

Figure 6:
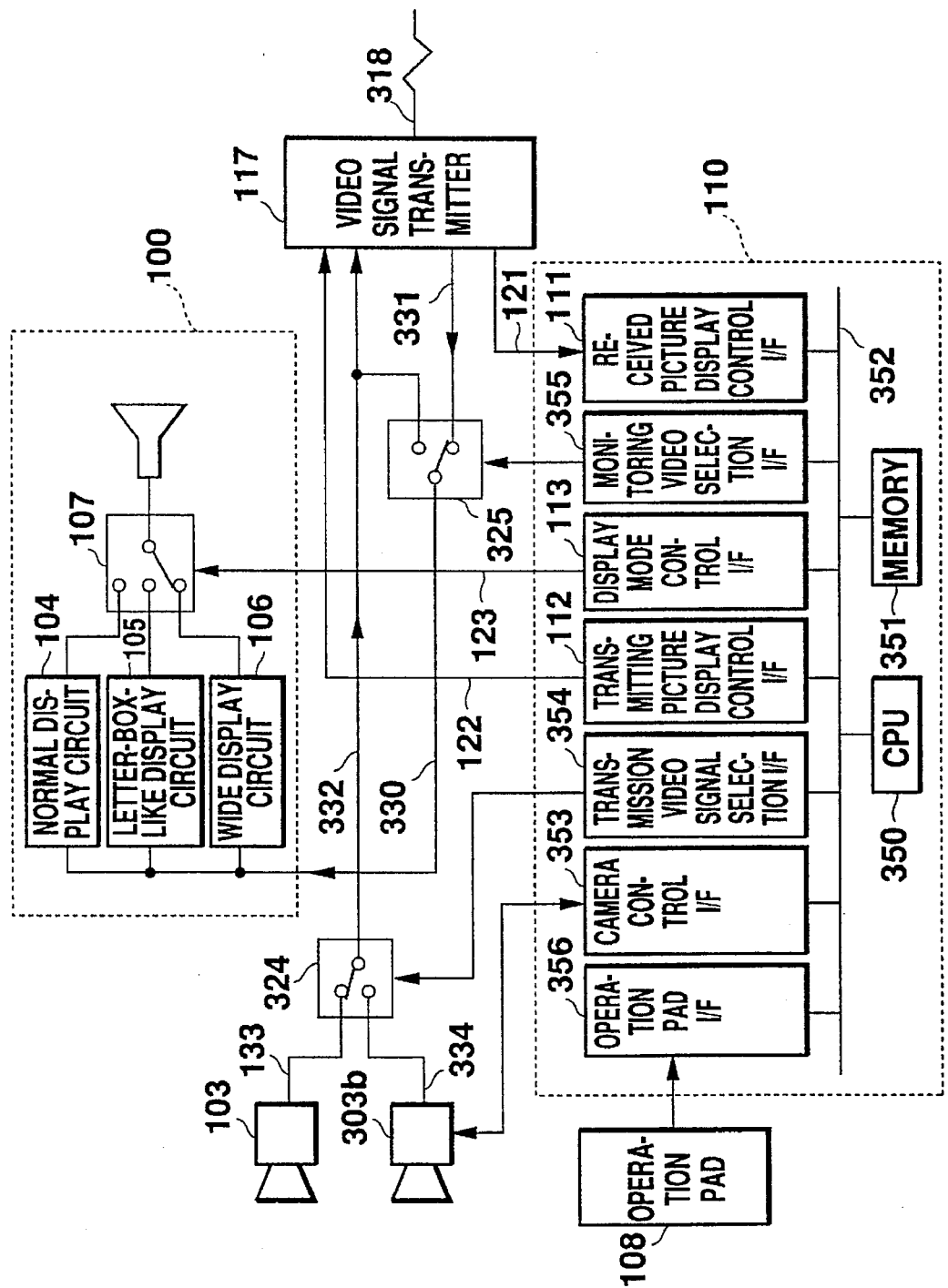
FIG. 6 is a block diagram showing the configuration of the third embodiment of the video transmission apparatus of the invention.

FIG. 6 is a block diagram showing the configuration of the third embodiment. In FIG. 6, components identical with those shown in FIG. 1 are denoted with the same numerals and description thereof will be omitted.

Figure 9:
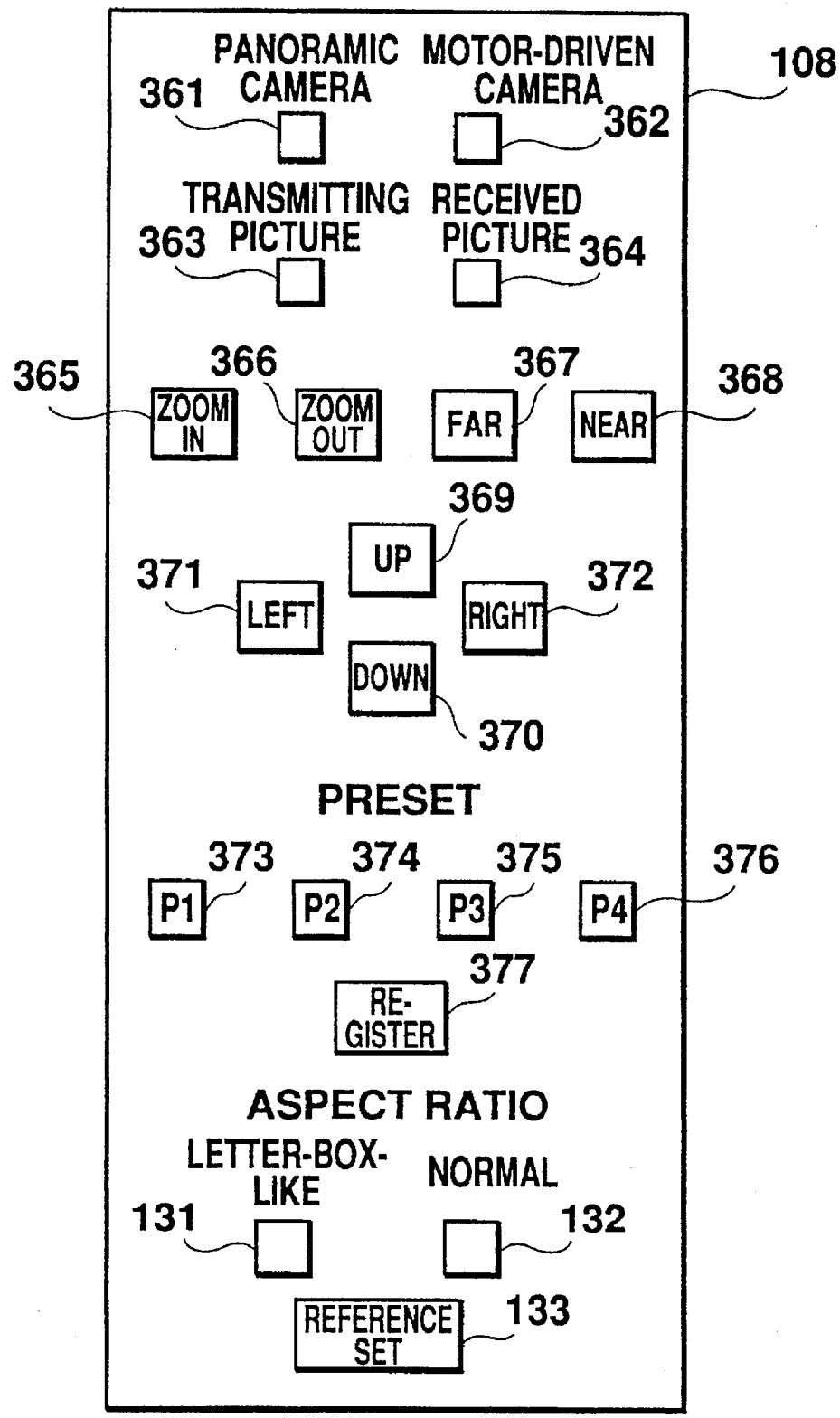
FIG. 9 is a drawing explaining the key layout of the operation pad in the third and fourth embodiments.

The configuration of the third embodiment differs from that of the first embodiment in that a horizontal elongation circuit 105 is added to the wide monitor 100. Therefore the display control signals 121 and 122 may take any of three values, "normal display", "wide display" and "letter-box-like display". In this embodiment, the operation pad 108 used in the operation differs a little from that shown in FIG. 12 because of the addition of the letter-box-like display circuit 105. An example of the key layout of the operation pad 108 used in this embodiment is shown in FIG. 9.

Figure 7:
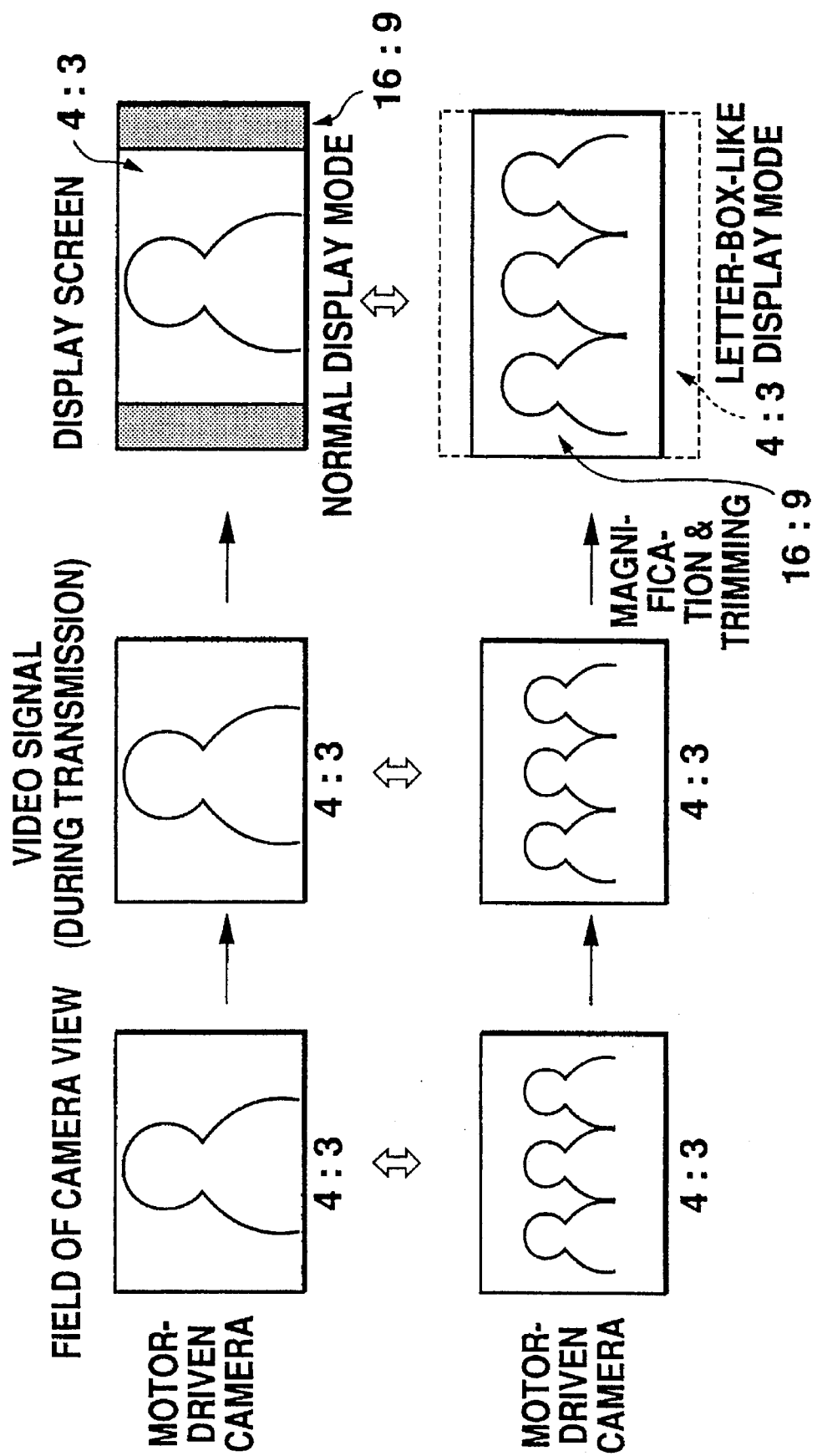
FIG. 7 is a drawing explaining the display modes (normal display mode and wide display mode) in the third embodiment.

"The letter-box-like display" described above is a method of display wherein the picture having an aspect ratio of 4:3 is magnified, and the top and bottom of the screen are cut off to generate a picture having an aspect ratio of 16:9 which is displayed, as shown in FIG. 7 (bottom). Therefore the "letter-box-like" display is essentially different from the "wide display" (in wide display, a picture captured with an aspect ratio of 16:9 is compressed in the horizontal direction to convert it into video signals having an aspect ratio of 4:3 which are transmitted and, at the receiving terminal, expanded to return the aspect ratio to 16:9 before being displayed, as shown in FIG. 2). While pictures captured by the motor-driven camera 303b are displayed in the normal display mode (aspect ratio 4:3) in the first embodiment, pictures captured by the motor-driven camera 303b can be displayed in any of the two display modes, normal display (aspect ratio 4:3) and letter-box-like display (aspect ratio 16:9), in this embodiment.

Details of key layout of the operation pad 108 will be described later, and therefore will not be described here.

The operation of transmitting video signals from the transmitting terminal to the receiving terminal when the video transmission apparatus shown in FIG. 6 is used will be described below. The description that follows will deal with the case where the transmitting terminal sends the pictures captured by the motor-driven camera while making such operations as zoom-in and zoom-out. It is assumed in the following description, however, that the "received picture" button 364 is pressed at the receiving terminal.

At the transmitting terminal, the operation pad input interface 356 checks, under the direction of the CPU 350, to see whether the ZOOM-IN button 365 or the ZOOM-OUT button 366 of the operation pad 108 (see FIG. 9) are pressed or not. According to the result of the examining operation, the camera control interface 353 controls the motor-driven camera 303b to zoom in or zoom out. At the same time, the camera control interface 353 determines the focal length of the camera which changes according to the zooming control. Then, the CPU 350 compares the focal length thus determined and a reference value (threshold) which has been stored in advance and, according to the result thereof, generates the transmission display control signal. When the focal length determined is not less than the reference value (for example, 50 mm which is the focal length allowing only one person to be in the field of view), because the field of view is narrow, the CPU 350 generates the transmission display control signal 122 having the value of "normal display" and sends it to the video transmitter 117 via the transmission display control interface 112. When the focal length is below the reference value, on the other hand, because the field of view is broad in this case, the CPU 350 generates the transmission display control signal 122 having the value of "letter-box-like display" and sends it to the video transmitter 117 via the transmission display control interface 112.

The video signal transmitter 117 multiplexes the transmission display control signal 122 and the video signal 332 and sends the resultant signal over the network 318, similarly to the case of the first embodiment.

At the receiving terminal, on the other hand, the signal from the network 318 is demultiplexed by the video signal transmitter 117 into the display control signal 121 and the video signal 331. At this time, the monitoring video signal selector 325 of the receiving terminal is switched to output the received video signal 331 to the wide monitor 100 under the control of the monitoring video signal selection interface 355.

The received picture display control interface 111 of the receiving terminal reads the received display control signal 121 from the video signal transmitter 117, based on the result of which the monitor display control interface 113 switches the display signal selection circuit 107. Because the video signal is now generated by the motor-driven camera of the transmitting terminal, the display control signal 121 received by the received picture display control interface 111 has a value of "normal display" or "letter-box-like display". When the display control signal 121 has a value of normal display, the display signal selection circuit 107 selects the output from the normal display circuit 104. As a result, the wide monitor 100 of the receiving terminal displays the pictures from the motor-driven camera in the normal display mode as shown in FIG. 7 at the top (video signals of aspect ratio 4:3 are displayed with the aspect ratio of 4:3 on the wide monitor of aspect ratio 16:9 so that the top and bottom of the picture correspond to the top and bottom of the monitor screen). When the display control signal 121 has a value of "letter-box-like display", the display signal selection circuit 107 selects the output from the letter-box-like display circuit 105. As a result, the wide monitor 100 displays the pictures from the motor-driven camera in the letter-box-like display mode as shown in FIG. 7 at the bottom (video signals having an aspect ratio of 4:3 are expanded so that the width of the picture equals the width of the screen having an aspect ratio of 16:9, with the top and bottom of the picture beyond the screen being cut off).

According to this embodiment, as described above, the display mode can be switched automatically to letter-box-like display mode when the field of view increases, or to normal mode when the field of view decreases, depending on the change in the area of the field of view as the motor-driven camera 303b is zoomed in or out. Therefore, pictures captured by a camera equipped with a zooming function can be displayed in any display format which provides the best live impression.

In the configuration of this embodiment (FIG. 6), the operation of transmitting and displaying the pictures captured by the panoramic camera 103 is similar to that of the first embodiment. For multiplex transmission with the video signal transmitter 117 of this embodiment, both digital multiplex transmission and analog multiplex transmission can be used, similarly to the first embodiment.

Figure 8:
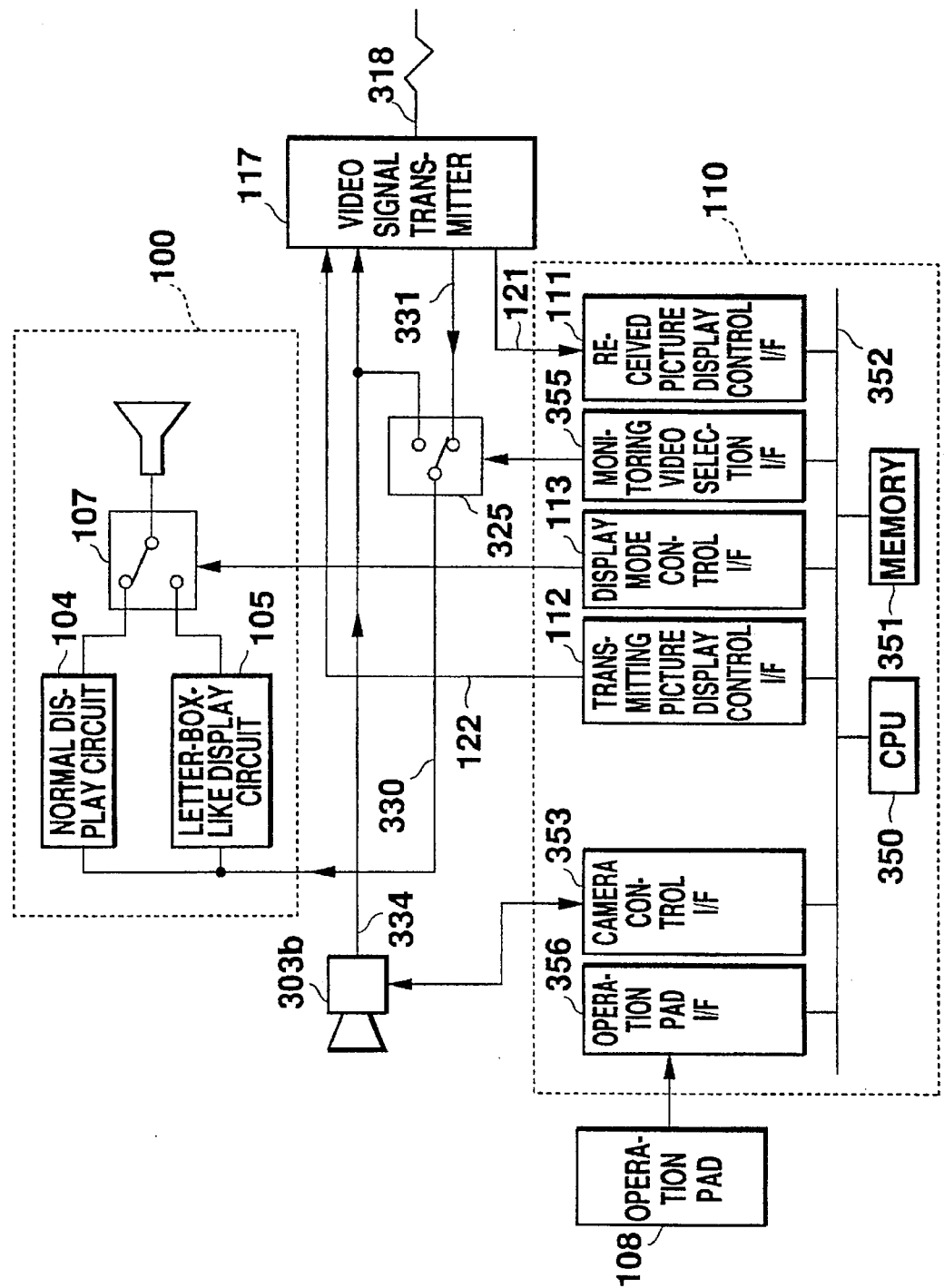
FIG. 8 is a block diagram showing a variation of the third embodiment.

Although two cameras, the wide camera 103 and the motor-driven camera 303b, are used in the third embodiment, similar operations can be achieved in a configuration provided only with the motor-driven camera 303b without the wide camera 103 as shown in FIG. 8. In this case, because of the absence of the wide camera 103, the transmission video signal selector 324, the wide display circuit 106 of the wide monitor 100 and the transmission video signal selection interface 354 become unnecessary (that is, the configuration shown in FIG. 8 is the configuration shown in FIG. 6 minus the wide camera 103, the transmission video signal selector 324, the wide display circuit 106 of the wide monitor 100 and the transmission video signal selection interface 354).

Although two cameras, for each of the two types, are provided in this embodiment, types and number of cameras can be increased. When increasing the types and number of cameras, it suffices to increase the inputs to the transmission video signal selector 324 to match the number of cameras, and to have the video controller 110 Carry out control according to the types.

Embodiment 4

Now the fourth embodiment of the invention will be described below. The fourth embodiment is an improved version of the third embodiment. In the third embodiment (FIG. 6), the aspect ratio of display of the video signal from the zoom camera 303b is switched (to normal display or letter-box-like display) according to the extent of the field of view of the camera depending on whether the focal length of the zoom camera is greater or less than a reference value, by using the focal length as an indicator for the extent of the field of view. Thus, a predetermined value is used as the reference for switching the aspect ratio in the third embodiment. The fourth embodiment, in contrast, has such a configuration that allows the user to set the reference value as desired. Therefore, the basic circuit configuration of this embodiment is similar to that of the third embodiment, namely similar to the configuration shown in FIG. 6 except that the arithmetic operations are carried out by the CPU 350, and these arithmetic operations are a little different from those of the third embodiment.

The extent of the field of view of the zooming camera varies according to the zoom-in and zoom-out operations. While magnification of the picture may be represented quantitatively by the zoom ratio, the focal length or other factors, focal length will be employed in the description of this embodiment.

The operation pad 108 of this embodiment is a variation of the operation pad 308 of FIG. 12,whereon the "letter-box-like" button 131, the "normal" button 132 and the "reference set" button 133 are added as shown in FIG. 9. Operation related to these buttons will be described below.

First, assume that a user has pressed the "motor-driven camera" button 362 and the transmitting picture button 363 on the operation pad 108. At this time, the wide monitor 100 displays the picture captured by the motor-driven camera of the present terminal. When the user further presses the "letter-box-like" button 131 of the operation pad 108, the operation pad input interface 356 recognizes the operation of the "letter-box-like" button 131 so that the display mode control interface 113 selects the switch of the display signal selector circuit 107 to have the output of the letter-box-like display circuit 105 displayed on the wide monitor 100. When the user presses the normal display button 132 of the operation pad 108, the operation pad input interface 356 recognizes the operation so that the display mode control interface 113 selects the switch of the display signal selector circuit 107 to have the output of the normal display circuit 104 displayed on the wide monitor 100. The display mode can be switched between letter-box-like mode and normal mode manually in this embodiment, as described above.

When the user further presses the "reference set" button 133, the operation pad input interface 356 recognizes the operation. The CPU 350, being informed by the operation pad input interface 356 that the "reference set" button 133 has been pressed, directs the camera control interface 353 to determine the current focal length of the motor-driven camera 303b. The current value of the focal length of the motor-driven camera 303b obtained by the camera control interface 353 is stored in the memory 351 as the display mode switching level (reference value).

Once the reference value has been set as described above, the apparatus of this embodiment switches the display mode by using the reference value according to the zoom-in or zoom-out operation similarly to the third embodiment. That is, when the current focal length exceeds the reference value, the apparatus of this embodiment switches the display mode to normal mode and, when the current focal length is less than the reference value, switches the display mode to letter-box-like mode.

Because this embodiment has the reference value setting function as described above, the user can set the reference value for switching the display mode while watching the picture captured by the motor-driven camera 303b which has the zoom function. Therefore, according to this embodiment, letter-box-like display mode or the normal display mode can be properly selected according to the distance of the object from the Embodiment 5

Now the fifth embodiment of the invention will be described below. The fifth embodiment relates to the operation of the video transmission apparatus shown in FIG. 6 by means of a preset button on the operation pad. In the related art, preset buttons of the operation pad are assigned to the focal length of the zoom lens, far or near focusing and camera orientation, which are used as the preset information for the operation of the motor-driven camera. In this embodiment, selection of the display mode, letter-box-like mode or normal mode, can be set as the preset information in addition to the those in the related art described above. FIG. 9 shows the operation pad used in this embodiment.

The operation of registering the preset information in this embodiment will be described below.

Registration of the preset information in this embodiment is carried out as follows: first the user presses the registration button 377 of the operation pad 108 shown in FIG. 9, then presses one of the preset buttons P1 to P4. Under the direction of the CPU 350 of the video controller 110, the operation pad input interface 356 recognizes the preset button operation. As a result, the CPU 350 takes in the camera view information (focal length of the zoom lens, far or near focusing and vertical/horizontal camera angles) via the camera control interface 353, relates the information to the respective preset buttons and stores the information in the memory 351. The CPU 350 then makes access to the operation pad input interface 356 and checks the current display mode to see whether it is letter-box-like mode or normal display mode (which of the letter-box-like mode button 131 and the normal display button 132 of the operation pad is pressed). The CPU 350 stores the result of the check as the display control information (representing letter-box-like mode or normal display mode) together with the camera view information in the memory 351 while relating them to the preset button which is pressed.

Now the operation of the video transmission apparatus of this embodiment, when a preset button with registered preset information being assigned thereto is pressed, will be described below. When one of the preset buttons P1 through P4 is pressed, the operation pad input interface 356 recognizes the operation. As a result, the CPU 350 extracts the preset information (camera view information and display control information) from the memory and sends the camera view information to the camera control interface 353, and the display control information to the transmission display control interface 112. The camera control interface 353 controls the motor-driven camera 303b according to the camera view information which has been supplied. The transmission display control interface 112 outputs the display control information to the video signal transmitter 117 as the transmission display control signal 122. Then under the control of the CPU 350, the transmission video signal selection interface 354 switches the transmission video signal selector 324 to have the video signal 334 received from the motor-driven camera 303b sent to the video signal transmitter 117 as the transmission video signal 332. In this way, the video signal from the motor-driven camera 303b controlled according to the preset information which corresponds to the preset button being pressed is sent to the receiving terminal together with the display control signal 122 which corresponds to the preset information.

In this embodiment, as described above, orientation and the zooming operation of the motor-driven camera and setting of the display mode can be done in a single button operation by registering the information on camera operations which are frequently required to preset buttons.

What is claimed is:

1. A video apparatus for video teleconference terminals, comprising:

at least two video signal generating means for generating video signals, each video signal generating means having an aspect ratio associated therewith;

selecting means for selecting one of the at least two video signal generating means;

means for detecting which video signal generating means is selected by the selecting means;

display control signal generating means for generating a display control signal which indicates the aspect ratio associated with the selected video signal generating means, in response to detection by the means for detecting of which video signal generating means is selected by the selecting means;

transmitting means for transmitting the video signal of the selected video signal generating means and the display control signal over a communication line;

receiving means for receiving a video signal and a display control signal associated therewith which indicates the aspect ratio for displaying the received video signal, the received video signal being received from the communication line from a source external to said video apparatus; and video display means for displaying one of the video signal received by the receiving means with the aspect ratio specified by the display control signal received by the receiving means and the video signal transmitted by the transmitting means with the aspect ratio of the selected video signal generating means.

2. The video apparatus of claim 1, wherein the transmitting means transmits the video signal and the display control signal after subjecting the video signal to digital compression and encoding; and the receiving means outputs the received video signal and the display control signal received by the receiving means to the video display means after subjecting the received video signal to digital decoding and expansion.

3. The video apparatus of claim 1, wherein one of the at least two video signal generating means is a camera which captures pictures in a field of view having a predetermined aspect ratio; and the display control signal generating means generates a signal indicating the predetermined aspect ratio as the display control signal.

4. The video apparatus of claim 1, wherein one of the at least two video signal generating means is a camera equipped with a zoom lens and means for giving an output indicating a magnification factor of a picture to be obtained by the zoom lens; and the display control signal generating means has comparing means for comparing the picture magnification factor of the zoom lens with a predetermined reference value, and signal generating means for generating the display control signal which indicates different aspect ratios depending on whether the picture magnification factor is greater or less than the reference value, based on a result of comparison.

5. The video apparatus of claim 4, wherein the transmitting means transmits the video signal and the display control signal after subjecting the video signal to digital compression and encoding; and the receiving means outputs the received video signal and the display control signal received by the receiving means to the video display mans after subjecting the received video signal to digital decoding and expansion.

6. The video transmission apparatus of claim 4, further comprising reference value setting means for setting the reference value; and reference value storing means for storing the reference value which is set, wherein
the comparing means compares the picture magnification factor with the reference value stored in the reference value storing means.

7. The video apparatus of claim 6, wherein
the reference value setting means includes indicating means and reference value intake means for setting, as the reference value, the picture magnification factor of the zoom lens indicated by the indicating means.

8. The video apparatus of claim 1, further comprising
aspect ratio input means for specifying one of a plurality of predetermined aspect ratios for the display control signal generating means; wherein
the display control signal generating means generates the display control signal indicating the aspect ratio specified by the aspect ratio input means.

9. The video apparatus of claim 8, wherein
the transmitting means transmits the video signal and the display control signal after subjecting the video signal to digital compression and encoding, and
the receiving means outputs the received video signal and the display control signal received by the receiving means to the video display means after subjecting the received video signal to digital decoding and expansion.

10. The video apparatus of claim 8, wherein
one of the at least two video signal generating means has a camera and camera control means for controlling the camera;
and the video apparatus further comprises;
camera operation input means which inputs a control instruction for the camera control means;
operation instruction registration means for registering the control instruction which is input by the camera operation input means for the camera control means, and the aspect ratio directed by the aspect ratio input means for the display control signal generating means, as one preset operation instruction;
registration operation directing means for directing registration of preset operation instructions for the operation instruction registration means;
preset operation instruction selecting means for selecting one of a plurality of the preset operation instructions registered by the operation instruction registration means; and
preset operation instructing means for instructing the camera control means and the display control signal generating means corresponding to the preset operation instruction selected by the preset operation instructing selecting means;
while under the instruction of the preset operation instructing means, the camera control means controls the camera, and the display control signal generating means generates the display control signal.

11. The video apparatus of claim 10, wherein
the transmitting means transmits the video signal and the display control signal after subjecting the video signal to digital compression and encoding; and
the receiving means outputs the received video signal and the display control signal received by the receiving means to the video display means after subjecting the received video signal to digital decoding and expansion.

12. A video signal apparatus for video teleconference terminals, comprising:

a plurality of video signal generating means, each generating a video signal representing a picture of a different aspect ratio;
video signal selection means for selecting one of the plurality of video signal generating means;
means for detecting which video signal generating means is selected by the video signal selection means;
display control signal generating means for generating a display control signal which indicates the aspect ratio of the video signal selected by the video signal selection means, in response to the means for detecting which video signal generating means is selected by the video signal selection means;
transmitting means for transmitting the video signal and the display control signal being related to each other, over a communication line;
receiving means for receiving a video signal and a display control signal associated therewith which indicates the aspect ratio for displaying the received video signal, the received video signal being received from the communication line from a source external to said video signal apparatus; and
video display means for displaying the video signal received by the receiving means with the aspect ratio specified by the display control signal received by the receiving means.

13. The video signal apparatus of claim 12, wherein
the transmitting means transmits the video signal and the display control signal after subjecting the video signal to digital compression and encoding; and
the receiving means outputs the received video signal and the display control signal received by the receiving means to the video display means after subjecting the received video signal to digital decoding and expansion.

14. The video signal apparatus of claim 12, wherein
the video display means comprises;
a monitor;
a plurality of video display circuits for displaying the received video signal on the monitor, wherein the video display circuits display pictures with an aspect ratio corresponding to one of the plurality of video signal generating means;
display circuit selecting means for selecting, from among the plurality of video display circuits, a circuit which matches the aspect ratio indicated by the display control signal received by the receiving means; wherein
the video signal received by the receiving means is displayed on the monitor by using a video display circuit selected by the display circuit selecting means.

15. A video apparatus for video teleconference terminals, comprising:
at least one video signal generating means for generating a video signal, the at least one video signal generating means having an aspect ratio associated therewith;
external video signal input means which receives an external video signal including an aspect ratio identification signal, extracts the aspect ratio identification signal from the external video signal and outputs the external video signal and the aspect ratio identification signal which have been extracted;
video signal selection means for selecting one of the external video signal input means and one of the at least one video signal generating means;

means for detecting which of the external video signal input means and the one of the at least one video signal generating means is selected by the video signal selection means;

display control signal generating means which, when a video signal selected by the video signal selection means is that from one of the at least one video signal generating means, generates a display control signal which indicates the aspect ratio associated with the selected video signal generating means, and, when a video signal selected by the video signal selection means is that from the external video signal input means, generates the display control signal which indicates the aspect ratio corresponding to the aspect ratio identification signal extracted from the external video signal, wherein the display control signal is generated in response to the means for detecting which of the external video signal input means and the one of the at least one video signal generating means is selected by the video signal selection means;

transmitting means for transmitting the video signal selected by the video signal selection means and the display control signal generated by the display control signal generating means, being related to each other, over a communication line;

receiving means for receiving a video signal and a display control signal associated therewith which indicates the aspect ratio for displaying the received video signal, the received video signal being received from the communication line from a source external to said video apparatus; and video display means for displaying the video signal received by the receiving means with the aspect ratio specified by the display control signal received by the receiving means.

16. The video apparatus of claim 15, wherein the transmitting means transmits the video signal and the display control signal after subjecting the video signal to digital compression and encoding; and the receiving means outputs the received video signal and the display control signal received by the receiving means to the video display means after subjecting the received video signal to digital decoding and expansion.

17. A video transmission and receiving apparatus comprising:

a video signal generator, which generates a first video signal;

means for detecting a focal length at which the video signal generator is operating;

a display control signal generator, for generating a display control signal which indicates an aspect ratio at which the first video signal is to be displayed, wherein the display control signal generator generates a first display control signal in response to the means for detecting the video signal generator operating in a first range of focal length, and a second display control signal different from the first display control signal in response to the means for detecting the video signal generator operating in a second range of focal length;

a video signal transmitter and receiver which transmits the first video signal and the display control signal associated therewith and receives a second video signal having a display control signal associated therewith from a source external to said video transmission and receiving apparatus; and a video display that displays one of the first video signal at the aspect ratio indicated by the display control signal associated therewith, and the second video signal at an aspect ratio indicated by the display control signal associated with the second video signal.

18. The apparatus of claim 17, further comprising:

an operation pad for setting a reference value of the focal length, the reference value of the focal length signifying an upper limit of the first range of the focal length and a lower limit of the second range of the focal length;

a memory for storing the reference value; and a central processing unit which compares the reference value of focal length stored in the memory to the focal length at which the video signal generator is operating.

19. The apparatus of claim 18, wherein the operation pad includes a button for initiating a setting of the reference value of the focal length, wherein the means for detecting detects the focal length of the video signal generator at the time the button is depressed.

* * * * *

UNITED STATES PATENT AND TRADEMARK OFFICE
CERTIFICATE OF CORRECTION

PATENT NO. : 5,659,369
DATED : August 19, 1997
INVENTOR(S) : Satoshi Imaiida

It is certified that error appears in the above-identified patent and that said Letters Patent is hereby corrected as shown below:

Column 3, line 55, change "358" to -- 356 --;
line 58, change "381" to -- 361 --;
line 59, change "382" to -- 362 --;
line 60, change "383" to -- 363 --;
line 62, change "384" to -- 364 --.

Column 5, line 7, change "384" to -- 364 --;
line 19, change "387" to -- 367 --;
line 20, change "388" to -- 368 --;
line 54, change "303" to -- 308 --;
line 56, change "303" to -- 308 --.

Column 11, line 34, change "382" to -- 362 --.

Column 12, line 26, change "transmit" to -- transmitting --.

Signed and Sealed this

Third Day of February, 1998

BRUCE LEHMAN

Attest:

Attesting Officer

Commissioner of Patents and Trademarks